(12) United States Patent
Sakamaki et al.

(10) Patent No.: US 9,292,424 B2
(45) Date of Patent: Mar. 22, 2016

(54) MEMORY CONTROLLER AND INFORMATION PROCESSING APPARATUS

(71) Applicant: FUJITSU LIMITED, Kawasaki-shi, Kanagawa (JP)

(72) Inventors: Hideyuki Sakamaki, Yokohama (JP); Hidekazu Osano, Hachioji (JP); Hiroshi Nakayama, Yokohama (JP); Kazuya Takaku, Kawasaki (JP); Masanori Higeta, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 268 days.

(21) Appl. No.: 13/937,369

(22) Filed: Jul. 9, 2013

(65) Prior Publication Data

US 2013/0297895 A1 Nov. 7, 2013

Related U.S. Application Data

(63) Continuation of application No. PCT/JP2011/050474, filed on Jan. 13, 2011.

(51) Int. Cl.
G06F 13/00 (2006.01)
G06F 12/00 (2006.01)
G06F 13/16 (2006.01)

(52) U.S. Cl.
CPC ............ *G06F 12/00* (2013.01); *G06F 13/1694* (2013.01)

(58) Field of Classification Search
CPC .................................................. G06F 13/1694
USPC .......................................................... 711/154
See application file for complete search history.

(56) References Cited

U.S. PATENT DOCUMENTS

| 5,727,182 | A | 3/1998 | Fukushima et al. |
| 6,298,426 | B1 * | 10/2001 | Ajanovic ...................... 711/172 |
| 6,321,282 | B1 * | 11/2001 | Horowitz et al. ............ 710/104 |
| 6,530,001 | B1 | 3/2003 | Lee |
| 8,089,824 | B2 * | 1/2012 | Shaeffer et al. ............ 365/233.1 |
| 2003/0016574 | A1 | 1/2003 | Hachiya |
| 2004/0054845 | A1 * | 3/2004 | Ware et al. .................... 711/100 |
| 2006/0192603 | A1 * | 8/2006 | Nguyen ............ H04L 25/03834 327/172 |
| 2006/0262586 | A1 * | 11/2006 | Solomon et al. .... G06F 12/0207 365/63 |
| 2007/0086268 | A1 * | 4/2007 | Shaetfer et al. ............... 365/233 |
| 2007/0255983 | A1 | 11/2007 | Funaba et al. |

(Continued)

FOREIGN PATENT DOCUMENTS

| JP | 8-305629 | 11/1996 |
| JP | 2000-187525 | 7/2000 |

(Continued)

OTHER PUBLICATIONS

Extended European Search Report issued Oct. 2, 2013 in corresponding European Patent Application No. 11855808.9.

(Continued)

*Primary Examiner* — Adam M Queler
*Assistant Examiner* — Edmund Kwong
(74) *Attorney, Agent, or Firm* — Staas & Halsey LLP

(57) ABSTRACT

A memory controller includes: a determination part configured to determine a type of a DIMM having a different address line topology based on SPD; a slew rate setting part configured to set a slew rate of an address signal based on the type of the DIMM determined by the determination part; and a delay setting part configured to set a data delay amount when reading/writing data.

8 Claims, 18 Drawing Sheets

(56) References Cited

U.S. PATENT DOCUMENTS

2010/0001758 A1* 1/2010 Dreps et al. .............. 326/30
2010/0146237 A1* 6/2010 Takai ...................... 711/167

FOREIGN PATENT DOCUMENTS

| JP | 2001-183422 | 7/2001 |
| JP | 2002-278825 | 9/2002 |
| JP | 2003-23349 | 1/2003 |
| JP | 2004-334675 | 11/2004 |
| JP | 2009-526323 | 7/2009 |
| JP | 2009-217344 | 9/2009 |
| WO | WO 2007/095080 | 8/2007 |

OTHER PUBLICATIONS

Patent Abstracts of Japan, Publication No. 2003-023349, Published Jan. 24, 2003.

Patent Abstracts of Japan, Publication No. 2009-217344, Published Sep. 24, 2009.

Patent Abstracts of Japan, Publication No. 2001-183422, Published Jul. 6, 2001.

Patent Abstracts of Japan, Publication No. 2002-278825, Published Sep. 27, 2002.

Patent Abstracts of Japan, Publication No. 08-305629, Published Nov. 22, 1996.

Patent Abstracts of Japan, Publication No. 2000-187525, Published Jul. 4, 2000.

International Search Report of International Application No. PCT/JP2011/050474 mailed Feb. 8, 2011.

Japanese Office Action mailed Jan. 7, 2014 in corresponding Japanese Application No. 2012-552580.

Patent Abstracts of Japan, Publication No. 2004-334675, Published Nov. 25, 2004.

* cited by examiner

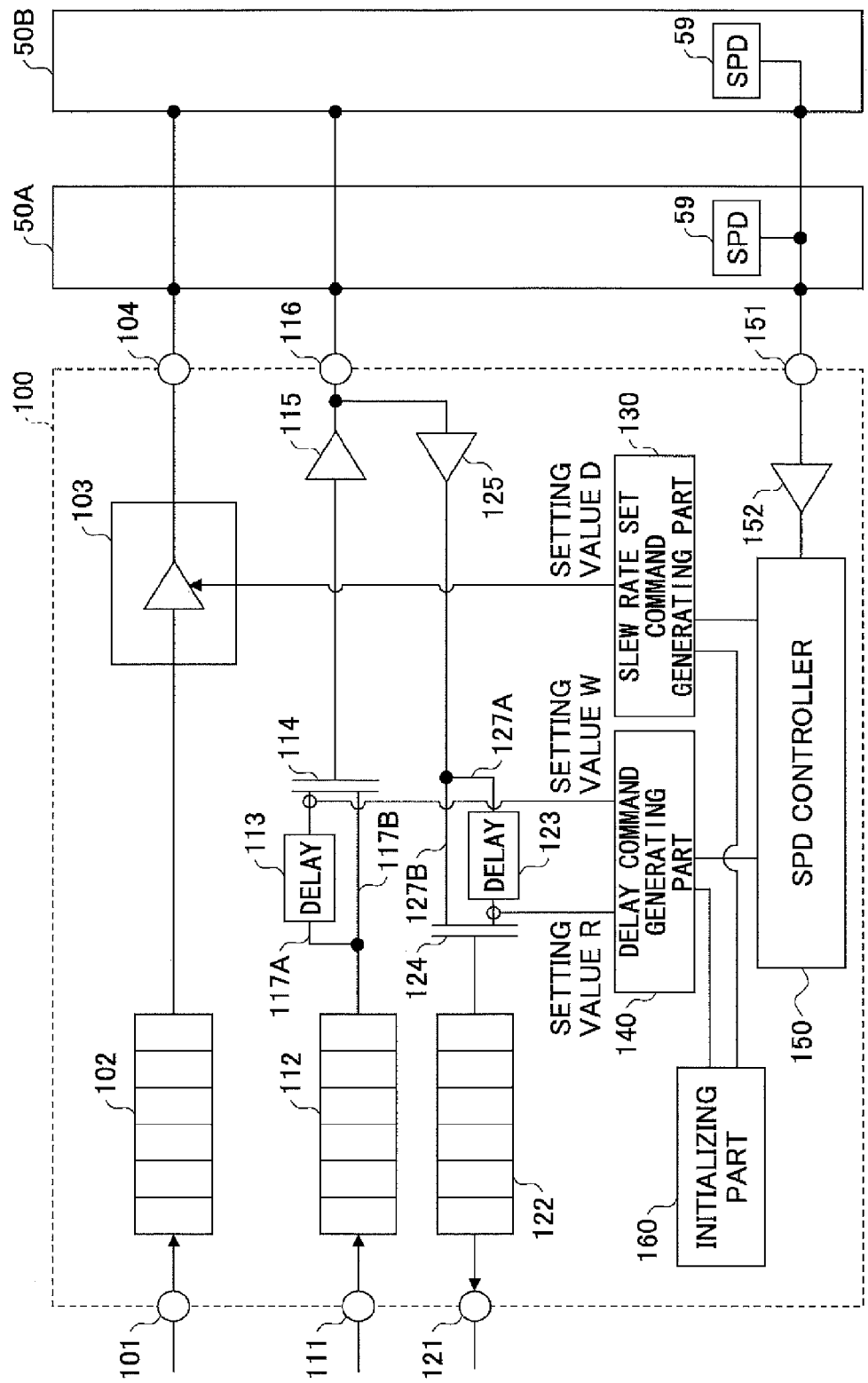

FIG.7A

| TERM | BYTE ADDRESS | | | | | | | DATA BIT | | | | | | | |
|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 |
| 1 | 0 | 0 | 0 | 0 | 0 | 0 | 1 | 1 | UNDEFINED | | | | D3 | D2 | D1 | D0 |

FIG.7B

| TERM | DATA BIT | | | | MODULE TYPE |
|---|---|---|---|---|---|
| | D3 | D2 | D1 | D0 | |
| 1 | 0 | 0 | 0 | 0 | UNDEFINED |
| 2 | 0 | 0 | 0 | 1 | RDIMM |
| 3 | 0 | 0 | 1 | 0 | UDIMM |
| 4 | SKIP THE REST | | | | |

FIG.9

| TERM | INPUT | | | OUTPUT | |
|---|---|---|---|---|---|
| | SETTING REGISTER | | | BIAS CURRENT | SLEW RATE |
| | S1 | S2 | S3 | | |
| 1 | 0 | 0 | 0 | — | — |
| 2 | 0 | 0 | 1 | MINIMUM | MINIMUM |
| 3 | 0 | 1 | 0 | ↓ | ↓ |
| 4 | 0 | 1 | 1 | | |
| 5 | 1 | 0 | 0 | | |
| 6 | 1 | 0 | 1 | | |
| 7 | 1 | 1 | 0 | ↓ | ↓ |
| 8 | 1 | 1 | 1 | MAXIMUM | MAXIMUM |

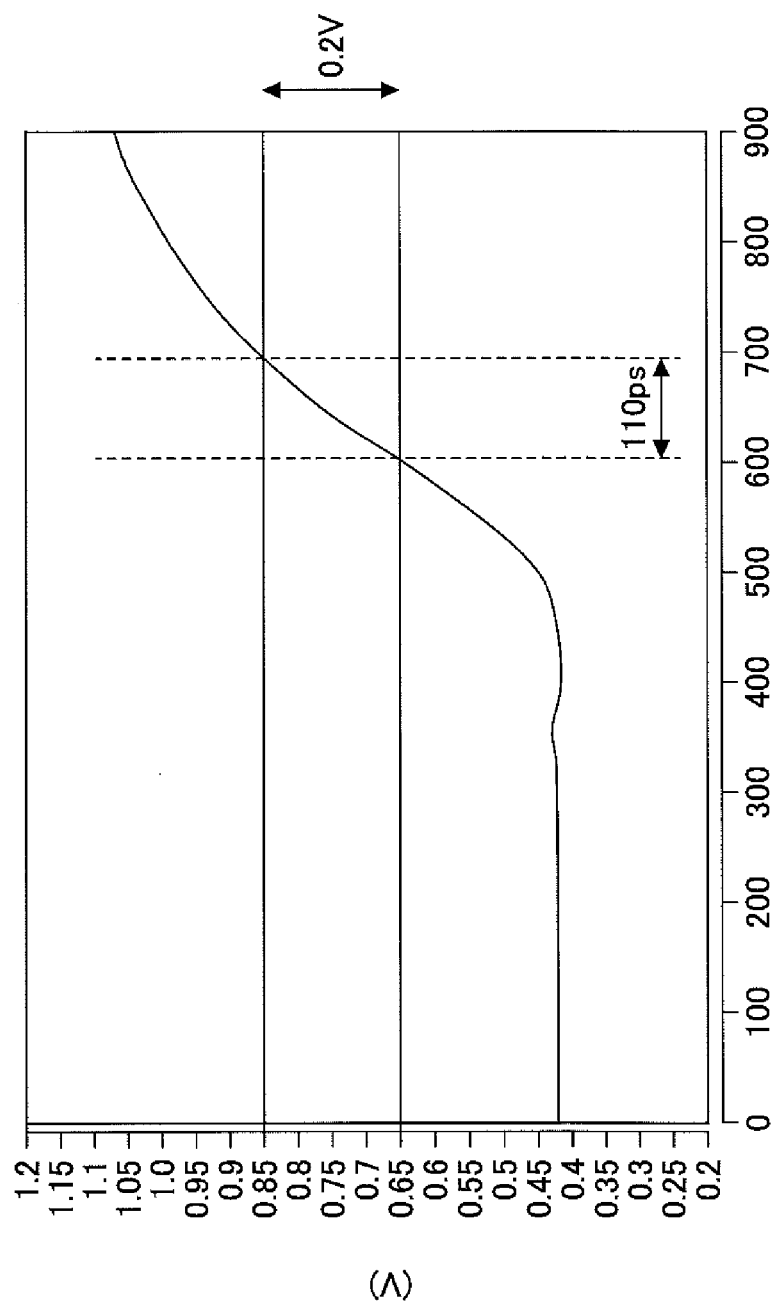

FIG.14

| TERM | INPUT | | OUTPUT | | | |
|---|---|---|---|---|---|---|
| | DEFAULT INITIAL VALUE | OUTPUT OF SPD CONTROLLER | SETTING VALUE | | | SLEW RATE |
| | | | R | W | D | |
| 1 | 00 | RDIMM | L | H | 111 | MAXIMUM |
| 2 | 01 | RDIMM | L | H | 110 | |
| 3 | 10 | RDIMM | L | H | 101 | |
| 4 | 11 | RDIMM | L | H | 100 | |
| 5 | 11 | UDIMM | H | L | 100 | |
| 6 | 10 | UDIMM | H | L | 011 | |
| 7 | 01 | UDIMM | H | L | 010 | |
| 8 | 00 | UDIMM | H | L | 001 | MINIMUM | ately produced
MEMORY CONTROLLER AND INFORMATION PROCESSING APPARATUS

CROSS-REFERENCE TO RELATED APPLICATIONS

This application is a continuation application of International Application PCT/JP2011/050474 filed on Jan. 13, 2011 and designated the U.S., the entire contents of which are incorporated herein by reference.

FIELD

The disclosures herein relate to a memory controller and an information processing apparatus.

BACKGROUND

Conventionally, there has been a subsystem including multiple memory circuits and an interface circuit capable of communicating with a system, in which the interface circuit provides an interface between the memory circuits and the system, and operates so that restrictions on the memory circuits for instruction scheduling are reduced. In such a subsystem, a circuit may be added, which controls a slew rate, pull-up capability or strength, and pull-down capability or strength for each pin in addition to timing calibration capability and compensation capability, to each I/O pin of an integrated buffer circuit, or added as a common circuit for a suite of I/O pins of the integrated buffer circuit.

Also, there is a semiconductor device characterized by a memory part for storing characteristic information that indicates intrinsic electrical characteristics of the semiconductor device, which makes it possible to adjust buffering capability of the semiconductor device based on the stored characteristic information in the memory part. As such characteristic information, characteristic variation information, slew rate, driving capability, voltage amplitude, current characteristic, and the like of the semiconductor device measured beforehand are stored in the memory part.

RELATED-ART DOCUMENTS

Patent Document

[Patent Document 1] Japanese Laid-open Patent Publication No. 2009-526323
[Patent Document 2] Japanese Laid-open Patent Publication No. 2003-023349

With development of semiconductor technology and packaging technology for LSI (Large Scale Integrated circuit) or the like, information processing apparatuses that have multiple CPUs (Central Processing Units) and a large-capacity main memory unit mounted on a single circuit board have been provided.

A blade server is an example of such an information processing apparatus. A blade server includes DIMMs (Dual Inline Memory Modules) as a large-capacity main memory unit.

Types of DIMMs are standardized by JEDEC (Joint Electron Devices Engineering Council), which is an industry standards body, and specifications are defined with JEDEC standard No. 21-C.

DIMMs include several types, for example, UDIMM (Unbuffered Dual Inline Memory Module) and RDIMM (Registered Dual Inline Memory Module).

A UDIMM and an RDIMM have different topologies of address lines. An RDIMM includes a registered chip for adjusting the waveform and timing of an address signal, whereas a UDIMM does not include a registered chip.

In general, for large devices such as blade servers, RDIMMs including registered chips are used, and for desktop PCs (Personal Computers), UDIMMs not including registered chips are used.

Incidentally, in a conventional device that is a subsystem or a semiconductor device or the like (referred to as a "conventional device", hereafter), the slew rate of an address signal is not set based on topological differences of the address line of DIMMs.

Therefore, if data read/write is attempted in such a conventional device for DIMMs having different topologies such as UDIMMs and RDIMMs, problems arise in that a correct address cannot be specified, or correct data cannot be read or written.

Consequently, memory controllers for UDIMMs and memory controllers for RDIMMs are separately produced due to the topological difference of the address line, conventionally.

Also, as described above, UDIMMs are used for devices with large production volume such as desktop PCs and RDIMMs are used for devices with comparatively small production volume such as blade servers, hence UDIMMs are cheaper than RDIMMs in general.

Also, memory controllers for RDIMM are more expensive than memory controllers for UDIMM because RDIMMs have smaller production volume than UDIMMs.

SUMMARY

According to an embodiment of the present invention, a memory controller includes: a determination part configured to determine a type of a DIMM having a different address line topology based on SPD; a slew rate setting part configured to set a slew rate of an address signal based on the type of the DIMM determined by the determination part; and a delay setting part configured to set a data delay amount when reading/writing data.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 6 is a schematic view illustrating a circuit of a memory controller 100 according to an embodiment;

FIG. 7A is a schematic view illustrating a part of data that represents specifications stored in an SPD element of an RDIMM or a UDIMM;

FIG. 7B is a schematic view illustrating concrete examples of values for data bits [3:0] illustrated in FIG. 7A;

FIG. 9 is a schematic view illustrating a relationship between data S1, S2, and S3 of a setting register 210, a bias current of a bias circuit 220 or 230, and a slew rate of an address signal of a memory controller 100 according to an embodiment;

FIG. 10B is a schematic view illustrating a simulation result of a rising waveform of an address signal when a slew rate is set to a minimum in a memory controller 100 according to an embodiment;

FIG. 14 is a schematic view illustrating a truth table illustrating behavior of a slew rate set command generating part 130 and a delay command generating part 140 of a memory controller 100 according to an embodiment.

DESCRIPTION OF EMBODIMENTS

In the following, embodiments of the present invention will be described, which are applied to a memory controller and an information processing apparatus.

Before describing the memory controller and the information processing apparatus according to the present embodiment, first, problems of a memory controller in a comparison example will be described with reference to FIGS. 1-5.

Figure 1:
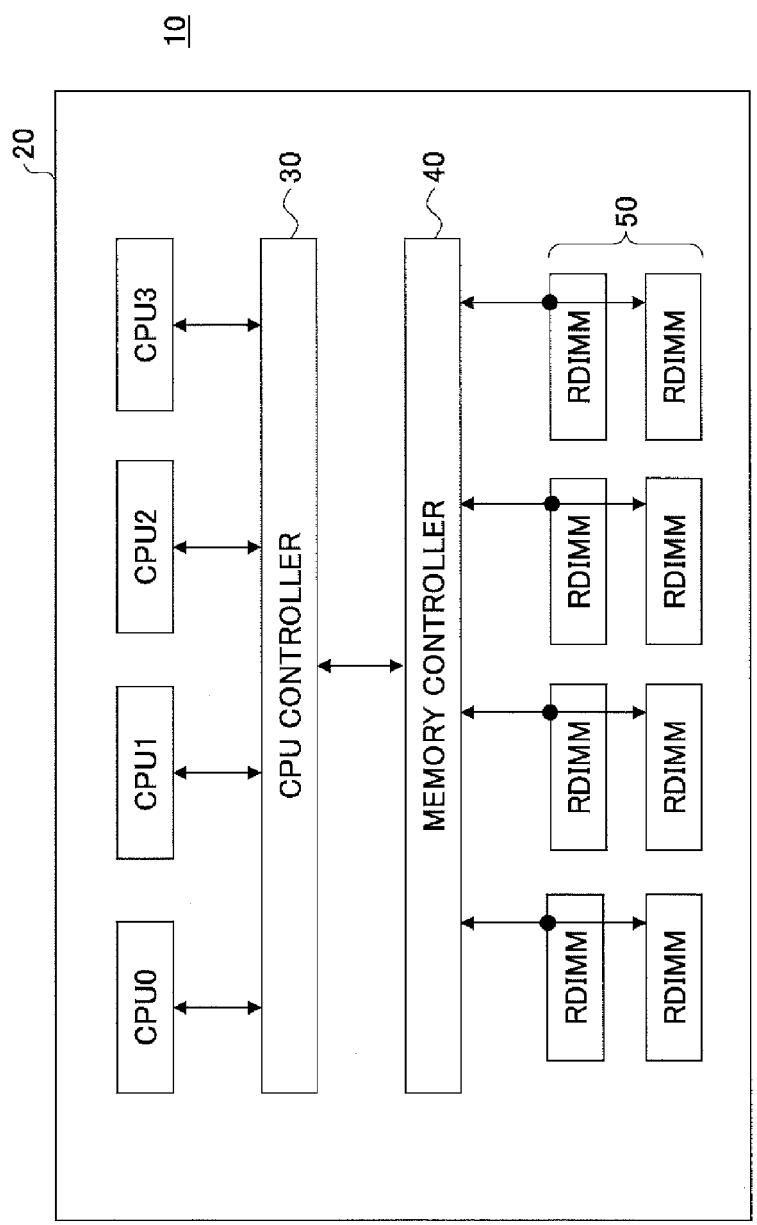
FIG. 1 is a schematic view illustrating a block configuration of a server 10 as an example of an information processing apparatus according to a comparison example.

FIG. 1 is a schematic view illustrating a block configuration of a server 10 as an example of an information processing apparatus according to the comparison example.

The server 10 includes a system board 20, a CPU0, a CPU1, a CPU2, a CPU3, a CPU controller 30, a memory controller 40, and RDIMMs 50.

The CPU0, CPU1, CPU2, CPU3, CPU controller 30, memory controller 40, and RDIMMs 50 are mounted on the system board 20. In FIG. 1, eight RDIMMs 50 are illustrated as an example.

The CPU controller 30 is a control part for controlling data transfer between the CPU0, CPU1, CPU2, and CPU3 and memory controller 40 when the CPU0, CPU1, CPU2, and CPU3 read/write data from/to the RDIMMs 50 via the memory controller 40.

The CPU controller 30 illustrated in FIG. 1 is connected with four CPUs, the CPU0 to CPU3, as an example.

The memory controller 40 is a control part for controlling data transfer between the CPU controller 30 and the RDIMMs 50 when the CPU0, CPU1, CPU2, and CPU3 read/write data from/to the RDIMMs 50 via the CPU controller 30.

The memory controller 40 illustrated in FIG. 1 is connected with eight RDIMMs 50 as an example.

The CPU0 to CPU3 read data stored in the RDIMMs 50, or write data into the RDIMMs 50, via the CPU controller 30 and the memory controller 40, and execute predetermined programs and the like for processing.

Thus, the server 10 illustrated in FIG. 1 includes the multiple CPU0 to CPU3 and the multiple RDIMMs 50.

In contrast to the above, a desktop PC has a configuration including, for example, one CPU and one or about two to three UDIMMs without including a CPU controller.

Next, with reference to FIG. 2, a mounting state of the memory controller 40 and the RDIMMs 50 in the comparison example will be described.

Figure 2:
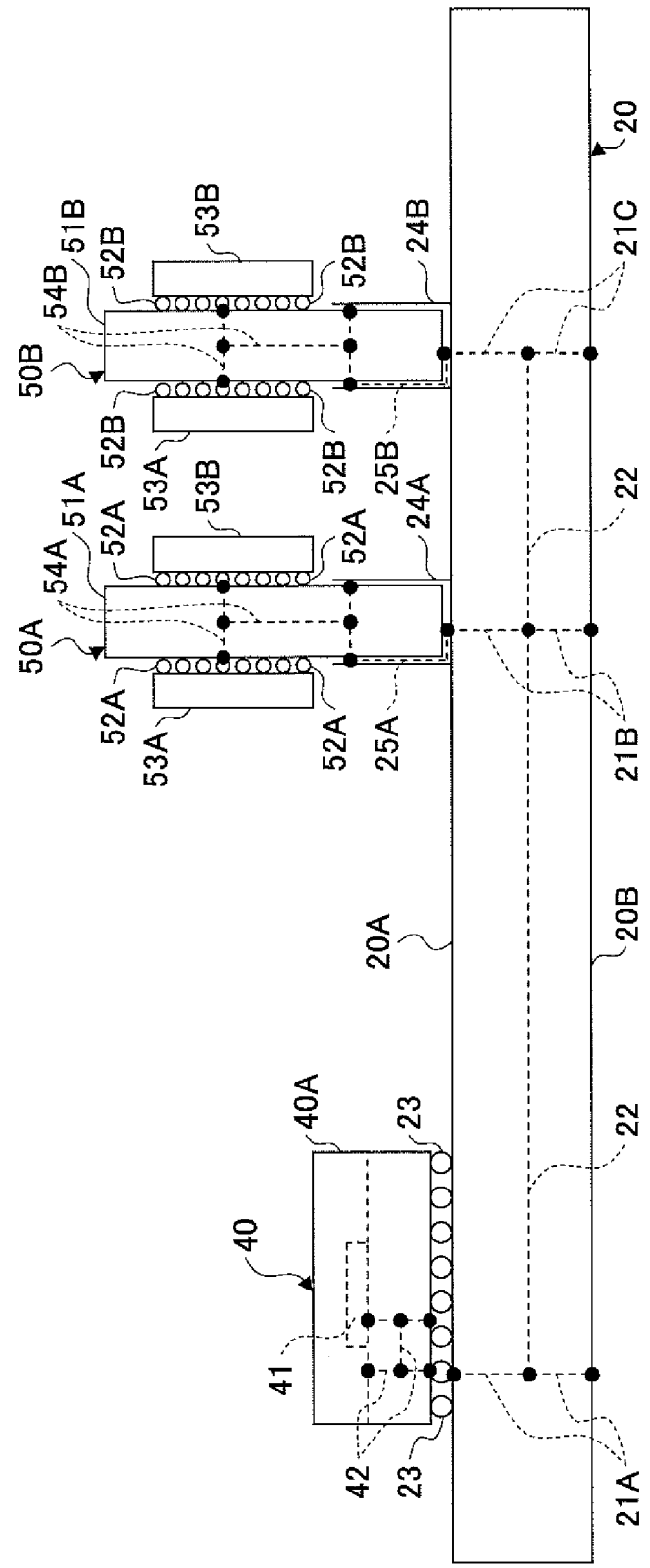
FIG. 2 is a side view illustrating an explanatory mounting state of a memory controller 40 and an RDIMM 50 according to the comparison example.

FIG. 2 is a side view illustrating an explanatory mounting state of the memory controller 40 and the RDIMMs 50 according to the comparison example.

In FIG. 2, although two RDIMMs are distinguished with numerical codes 50A and 50B for the sake of explanation, the RDIMMs 50A-50B are two of the eight RDIMMs 50 in FIG. 1. The other six RDIMMs 50 not illustrated in FIG. 2 are similarly connected as the RDIMMs 50A-50B.

In the following, the RDIMMs 50A-50B may be referred to as the RDIMMs 50 if explicit distinction is not required As described above, the memory controller 40 and the RDIMMs 50A-50B are mounted on the system board 20.

The system board 20 has vias 21A, 21B, 21C, and a multi-layer wiring 22. In FIG. 2, the vias 21A, 21B, 21C, and multi-layer wiring 22 are illustrated with dashed lines.

Each of the vias 21A, 21B, and 21C penetrates through the system board 20 in the thickness direction to connect two main surfaces 20A-20B with each other.

The multi-layer wiring 22 is formed near the center of the system board 20 in the thickness direction, in parallel with the two main surfaces 20A and 20B.

The memory controller 40 is mounted on the system board 20 with bumps 23, and an IC (Integrated Circuit) chip 41 in a housing 40A is connected with the multi-layer wiring 22 via a wiring 42 in the memory controller 40, which is designated with a dashed line, and a bump 23. The IC chip 41 controls data transfer between the CPU controller 30 (see FIG. 1) and the RDIMMs 50A-50B.

The RDIMMs 50A-50B are inserted into sockets 24A-24B disposed on the main surface 20A of the system board 20. The sockets 24A-24B are connected with the vias 21B-21C, respectively. Here, wirings 25A and 25B formed in the sockets 24A-24B, respectively, are designated with dashed lines.

The RDIMMs 50A-50B have substrates 51A-51B, respectively. The substrates 51A-51B have SDRAMs (Synchronous Dynamic Random Access Memory) 53A-53B mounted with bumps 52A-52B, respectively. Namely, the substrates 51A-51B hold the SDRAMs 53A-53B with dual-sided mounting.

The RDIMMs 50A-50B are connected with multi-layer wirings 54A-54B in the substrates 51A-51B via bumps 52A-52B, respectively. The multi-layer wirings 54A-54B are connected with the vias 21B-21C via the wirings 25A-25B in the sockets 24A-24B, respectively.

With the wiring structure described above, the memory controller 40 and the RDIMMs 50A-50B are electrically connected with each other. The wirings connecting the memory controller 40 with the RDIMMs 50 transmit a clock signal, an address signal, a data strobe signal, and data.

Here, in FIG. 2, the memory controller 40 and the RDIMMs 50A-50B mounted on a system board 20 have been described. UDIMMs are similarly mounted on the system board to be connected with a memory controller as explained with the RDIMMs 50A-50B illustrated in FIG. 2.

Next, with reference to FIG. 3, a circuit that connects the memory controller 40 with the RDIMMs 50 will be described.

Figure 3:
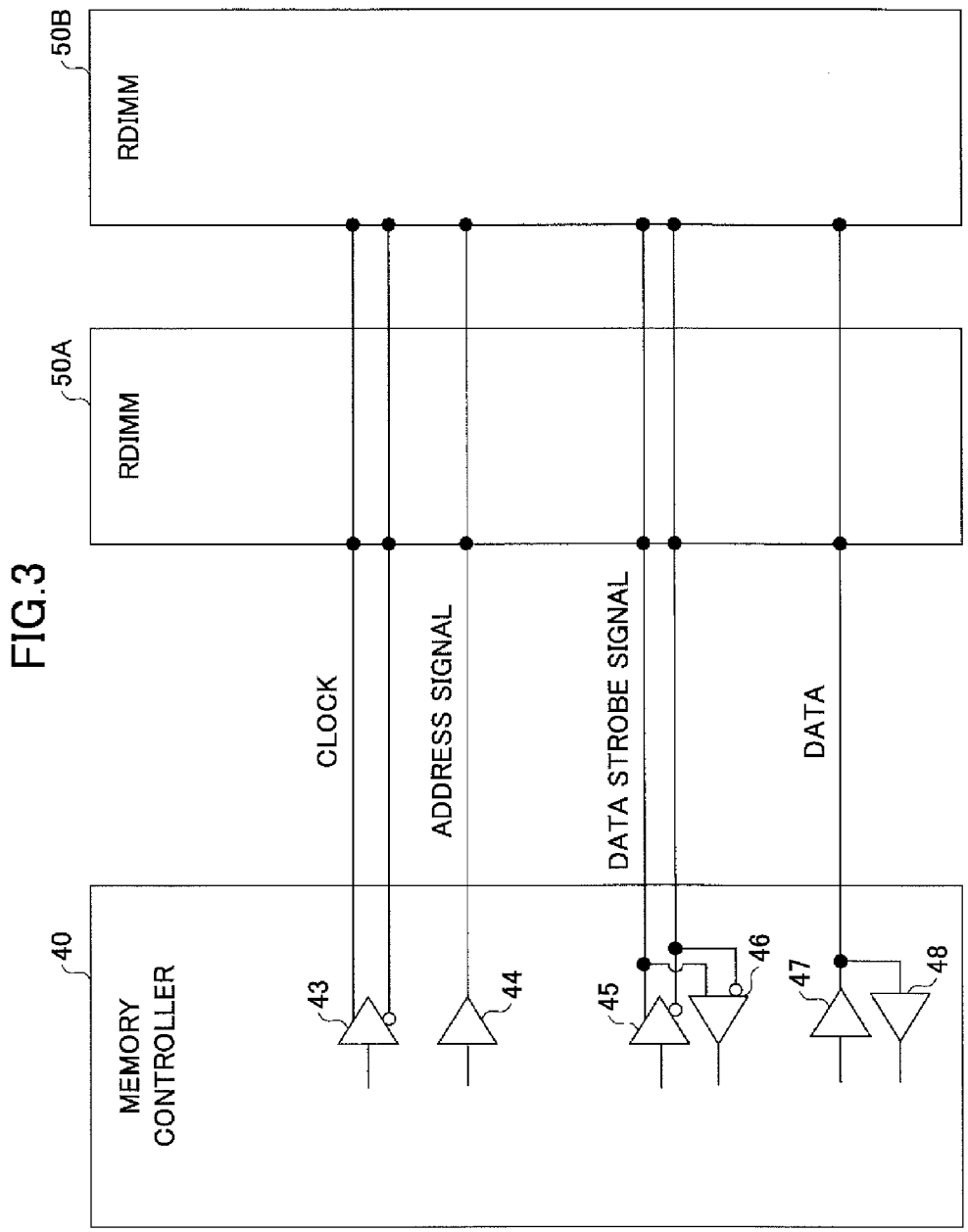
FIG. 3 is a schematic view illustrating a circuit of a memory controller 40 of the server 10 according to the comparison example.

FIG. 3 is a schematic view illustrating a circuit in the memory controller 40 of the server 10 according to the comparison example. FIG. 3 illustrates a state of the circuit where the memory controller 40 is connected with the RDIMMs 50A-50B. Here, in FIG. 3, SDRAMs in the RDIMMs 50A-50B are not illustrated.

As described above, the clock signal, the address signal, the data strobe signal, and the data are transmitted between the memory controller 40 and the RDIMMs 50.

The memory controller 40 has drivers 43, 44 and 45, a receiver 46, a driver 47, and a receiver 48. The drivers 43, 44, 45, receiver 46, driver 47, and receiver 48 are elements built in the IC chip 41 (see FIG. 2).

The driver 43 receives the system clock as input, generates a differential clock signal from the system clock, and transmits the differential clock signal to the RDIMMs 50A-50B.

The driver 44 receives the address signal as input from a decoder (not illustrated) that decodes the address signal for the RDIMMs 50A-50B, and transmits the address signal to the RDIMMs 50A-50B.

The driver 45 generates the differential strobe signal that specifies read/write timing of the data, and transmits the differential strobe signal to the RDIMMs 50A-50B.

A pair of output terminals to which the driver 45 outputs the differential strobe signal is connected with a pair of input terminals of the receiver 46, with which the receiver 46 receives the differential strobe signal from the RDIMMs 50A-50B.

The driver 47 transmits write data into the RDIMMs 50A-50B. The output terminal of the driver 47 is connected with the input terminal of the receiver 48, with which the receiver 48 receives the data read out of the RDIMMs 50A-50B.

Here, with FIG. 1 to FIG. 3, a relationship of connections between the memory controller 40 and the RDIMMs 50 in the server 10 has been described. A relationship of connections between a memory controller and UDIMMs in a desktop PC is, for example, basically the same although the number of UDIMMs may be less.

Next, with reference to FIG. 4 and FIG. 5, a topological difference of an RDIMM and a UDIMM with respect to an address line will be described.

Figure 4:
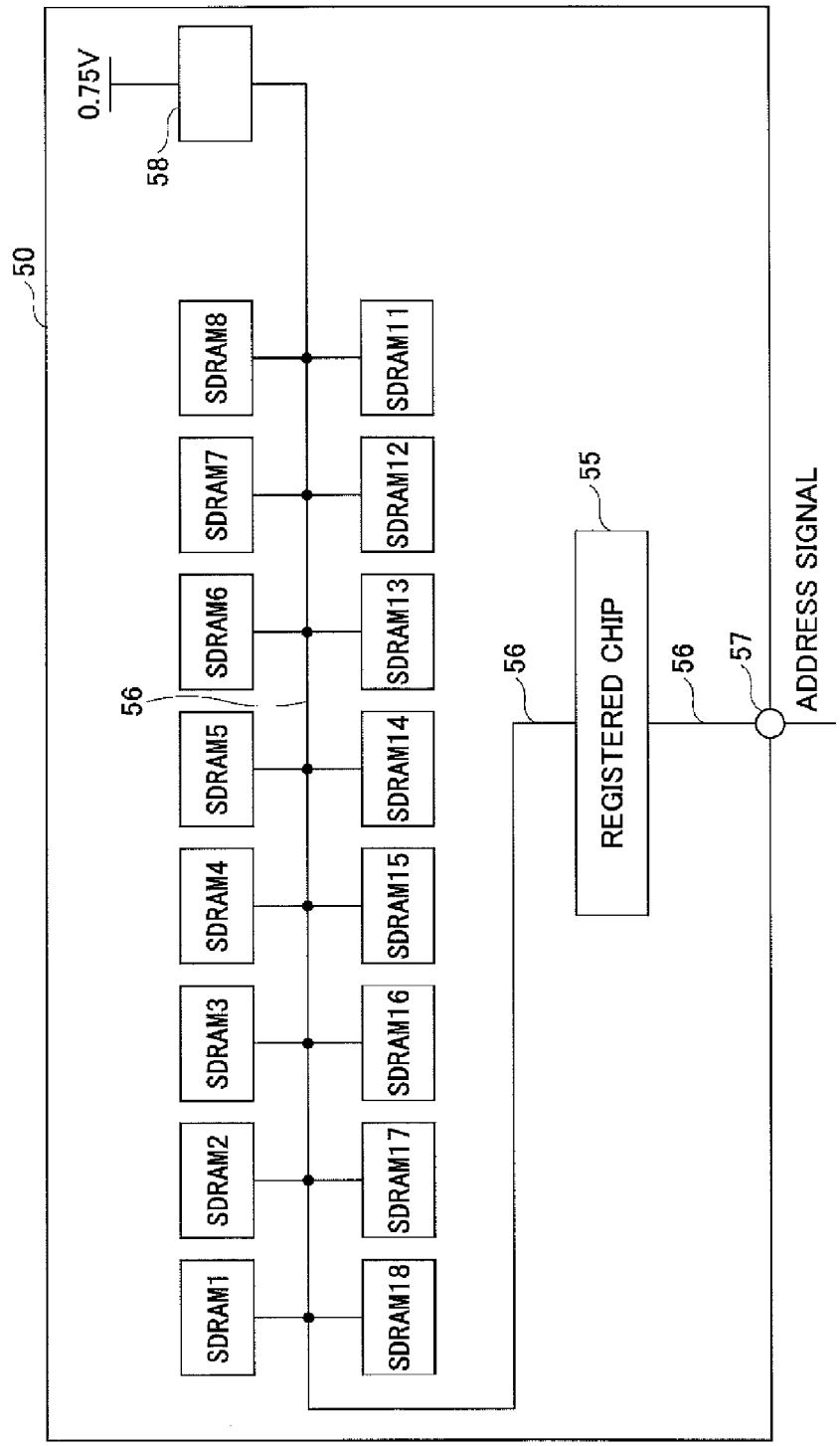
FIG. 4 is a schematic view illustrating a circuit of an address line of an RDIMM 50.
Figure 5:
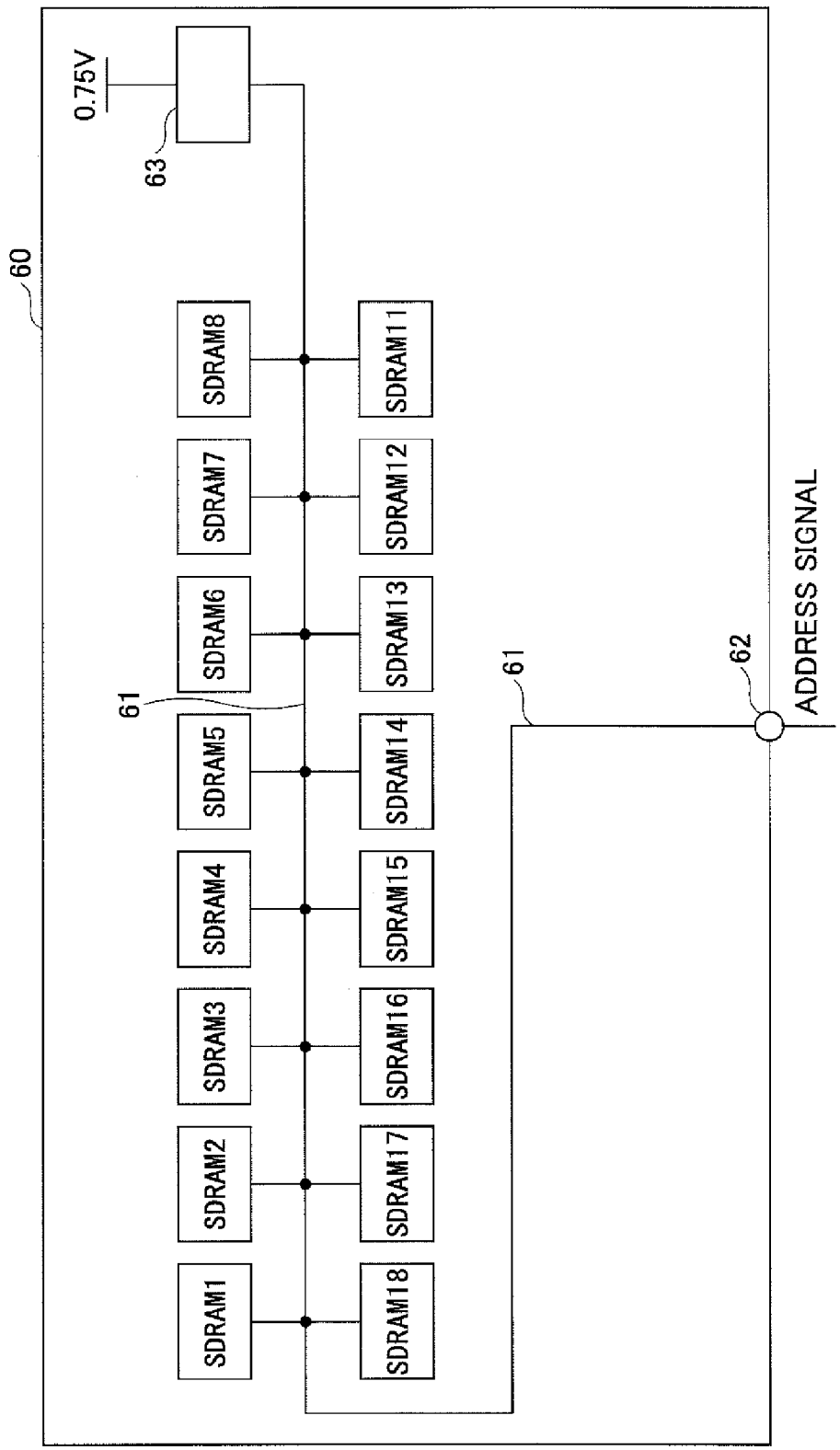
FIG. 5 is a schematic view illustrating a circuit of an address line of a UDIMM 60.

FIG. 4 is a schematic view illustrating a circuit of the address line of an RDIMM 50. FIG. 5 is a schematic view illustrating a circuit of the address line of a UDIMM 60.

The RDIMM 50 includes 16 SDRAMs, or SDRAM1-SDRAM8 and SDRAM11-SDRAM18, a registered chip 55, the address line 56, an input terminal 57, and a terminating resistor 58. The terminating resistor 58 is connected with a power source for a predetermined voltage (0.75 V). The terminating resistor 58 is provided for impedance matching at the terminating end of the address line 56 to suppress reflection of an address signal transmitted through the address line 56.

Here, the voltage (0.75 V) of the power source with which the terminating resistor 58 is connected corresponds to a threshold value between "0" and "1" for the address signal. The threshold value is specified in JEDEC standards.

The input terminal 57 is connected with the driver 44 of the memory controller 40 (see FIG. 3) to receive an address signal as input from the memory controller 40.

The address line 56 is wired between the input terminal 57 and the terminating resistor 58 with the registered chip 55 inserted, and distributed to SDRAM1-SDRAM8 and SDRAM11-SDRAM18 at the output side of the registered chip 55.

The address signal is input to the address line 56 via the input terminal 57 from the memory controller 40 (see FIG. 3), with waveform and timing adjusted by the registered chip 55 before being input to SDRAM1-SDRAM8 and SDRAM11-SDRAM18.

The registered chip 55 is inserted as above mainly for the following reason. In a large server such as a blade server, a wire for transmitting the address signal between the memory controller 40 and the RDIMMs 50 tends to become long because a number of RDIMMs 50 are mounted on the system board 20 (see FIG. 2). A long wire for transmitting the address signal induces a possibility that the address signal is attenuated during transmission. Therefore, at the moment when the address signal is received at the RDIMMs 50 as input, the waveform and timing of the address signal are rectified by the registered chip 55 before distributing to the SDRAMs.

Next, a UDIMM 60 illustrated in FIG. 5 will be described. Here, it is assumed in the following description that one UDIMM 60, instead of the RDIMMs 50A-50B illustrated in FIG. 3, is mounted on the system board 20, and is connected with the memory controller 40.

The UDIMM 60 includes 16 SDRAMs, or SDRAM1 to SDRAM8 and SDRAM11 to SDRAM18, an address line 61, an input terminal 62, and a terminating resistor 63. The terminating resistor 63 is connected with a power source for the predetermined voltage (0.75 V) similarly with the RDIMMs 50 illustrated in FIG. 4.

The terminating resistor 63 is provided for impedance matching at the terminating end of the address line 61 to suppress reflection of the address signal transmitted through the address line 61.

Here, the voltage (0.75 V) of the power source with which the terminating resistor 63 is connected corresponds to the threshold value between "0" and "1" for the address signal. The threshold value is specified in JEDEC standards.

The input terminal 62 is connected with the driver 44 of the memory controller 40 (see FIG. 3) to receive the address signal as input from the memory controller 40.

The address line 61 is wired between the input terminal 62 and the terminating resistor 63, and distributed to SDRAM1-SDRAM8 and SDRAM11-SDRAM18 between the input terminal 62 and the terminating resistor 63.

The address signal is input to the address line 61 via the input terminal 62 from the memory controller 40 (see FIG. 3), and is input directly to SDRAM1-SDRAM8 and SDRAM11-SDRAM18. The UDIMM 60 does not include a registered chip.

Here, in general, the number of UDIMMs 60 that a desktop PC includes is one or about two to three. Therefore, the length of a transmission line for transmitting the address signal between the memory controller 40 and the UDIMM 60 is considerably shorter than a transmission line in a blade server.

Therefore, UDIMMs 60 are used in desktop PCs in general.

Incidentally, a UDIMM 60 does not include a registered chip, hence the address signal distributed from the memory controller 40 is distributed directly to all SDRAMs in the UDIMM 60.

Therefore, electrical load of the address line in a UDIMM 60 is greater than in an RDIMM 50.

For example, if a UDIMM 60 is mounted with 4-bit SDRAMs, the address signal is distributed directly to 16 SDRAMs from the memory controller 40.

In such a case, there is a problem in that there is a possibility that a reflected wave is generated, which disturbs the address signal to be received by the SDRAMs, because 16 SDRAMs are connected directly with the memory controller 40 via the address line per UDIMM 60.

In a UDIMM 60, there is an SDRAM close to the input terminal 62 and an SDRAM away from the input terminal 62, hence the difference of distances from the input terminal 62 induces a possibility of waveform disturbance due to a reflected wave.

If the waveform of the address signal is disturbed, there is a problem in that a possibility arises that address specification cannot be executed correctly.

As above, the memory controller 40 in the comparison example has the problem in that a possibility arises that address specification cannot be executed correctly if UDIMMs 60 are used.

In embodiments below, a memory controller and an information processing apparatus will be described, which realize a solution for problems caused by waveform disturbance of an address signal, so that DIMMs having different address line topologies, for example, RDIMMs and UDIMMs, can be utilized, correct address specification and read/write of data can be executed, and manufacturing cost can be reduced.

Embodiment

FIG. 6 is a schematic view illustrating a circuit of a memory controller 100 according to the present embodiment. FIG. 6 illustrates a state of the circuit where the memory controller 100 is connected with RDIMMs 50A-50B. Here, in FIG. 6, SDRAMs in the RDIMMs 50A-50B are not illustrated.

The memory controller 100 according to the present embodiment described below is connected between the RDIMMs 50 and the CPU controller 30 (see FIG. 1), similarly as is the memory controller 40 in the comparison example. Therefore, in the following description, FIG. 1 to FIG. 5 are quoted so that the same or equivalent configuration elements as in FIG. 1 to FIG. 5 are assigned with the same numerical codes, and their description is omitted.

The memory controller 100 includes an input terminal 101, a shift register 102, a driver 103, and an output terminal 104.

The memory controller 100 further includes an input terminal 111, shift registers 112 and 122, delay parts 113 and 123, multiplexers 114 and 124, a driver 115, an input/output terminal 116, an output terminal 121, and a receiver 125.

The memory controller 100 further includes a slew rate set command generating part 130, a delay command generating part 140, an SPD controller 150, an input terminal 151, a receiver 152, and an initializing part 160.

The RDIMMs 50A-50B illustrated in FIG. 6 are illustrated with SPD (Serial Presence Detection) elements 59. Each of the SPD elements 59 stores data that represents specifications of a DIMM such as capacity of the module, access speed, access method, and the like. The SPD elements 59 are, for example, serial EEPROM (Electrically Erasable and Programmable Read Only Memory) chips.

As the SPD elements 59 of the RDIMMs 50 are illustrated in FIG. 6, a UDIMM 60 (see FIG. 5) also includes a similar SPD element.

Each of the SPD elements 59 of the RDIMMs 50 stores data representing specifications that indicates it is an RDIMM, and a SPD element of a UDIMM 60 (see FIG. 5) stores data representing specifications that indicates it is a UDIMM.

The input terminal 101 is a terminal for inputting an address signal transmitted from a decoder (not illustrated) into the memory controller 100. The input side of the input terminal 101 is connected with the decoder (not illustrated), and the output side of the input terminal 101 is connected with the shift register 102.

The shift register 102 temporarily holds the address signal input from the decoder via the input terminal 101. The output side of the shift register 102 is connected with the driver 103.

The driver 103 is an example of a slew rate changing part that changes the slew rate of the address signal input from the shift register 102 based on a setting value D input from the slew rate set command generating part 130.

Also, the driver 103 as the example of the slew rate changing part and the slew rate set command generating part 130 are an example of a slew rate setting part for setting the slew rate of the address signal. An internal configuration and behavior of the driver 103 will be described later with reference to FIG. 7.

The output terminal 104 is a terminal for outputting the address signal whose slew rate is set by the driver 103 to the RDIMMs 50 from the memory controller 100, which is connected with the input terminal 57 of the RDIMMs 50 (see FIG. 4). Here, if the memory controller 100 is connected with a UDIMM 60 (see FIG. 5), the output terminal 104 is connected with the input terminal 62 (see FIG. 5).

The input terminal 111 is a terminal for inputting data into the memory controller 100, which is to be written into the RDIMMs 50. The input side of the input terminal 111 is connected with CPU0 to CPU3 (see FIG. 1) via the CPU controller 30.

The shift register 112 temporarily holds write data input via the input terminal 111. The output side of the shift register 112 is connected with the delay part 113 and the multiplexer 114.

The delay part 113 is inserted on a signal line 117A among signal lines 117A and 117B that are branched at the output side of the shift register 112. The delay part 113 gives a delay to the write data output from the shift register 112, then outputs the data. The delay time given by the delay part 113 is set to one cycle time of the system clock. Here, both of the signal lines 117A and 117B are connected with the input side of the multiplexer 114. Also, the reason why the delay time is set to one cycle time of the system clock will be described later.

The multiplexer 114 outputs the write data input to it via either of the signal line 117A or signal line 117B connected at the input side of it, based on a setting value W input from the delay command generating part 140. The output side of the multiplexer 114 is connected with the driver 115.

The driver 115 is inserted between the output terminal of the multiplexer 114 and the input/output terminal 116 to rectify the waveform of the data and to amplify the data to be output from the memory controller 100 via the input/output terminal 116. A signal line branched off at the output side of the driver 115, between the driver 115 and the input/output terminal 116, is connected with the receiver 125.

The input/output terminal 116 is connected with the output side of the driver 115 and the input side of the receiver 125. The input/output terminal 116 outputs write data transmitted from the driver 115 to the RDIMMs 50A-50B, and inputs read data transmitted from the RDIMMs 50A-50B into the receiver 125.

The receiver 125 is connected between the input/output terminal 116 and the delay part 123 or the multiplexer 124 to transmit read data input to the memory controller 100 via the input/output terminal 116 to the delay part 123 and the multiplexer 124. The receiver 125 rectifies the waveform of the read data and amplifies the data when transmitting the data to the delay part 123 and the multiplexer 124.

The delay part 123 is inserted on a signal line 127A among signal lines 127A and 127B that are branched at the output side of the shift register 125. The delay part 123 gives a delay to the read data output from the receiver 125, then outputs the data. The delay time given by the delay part 123 is set to one cycle time of the system clock. Here, both of the signal lines 127A and 127B are connected with the input side of the multiplexer 124. Also, the reason why the delay time is set to one cycle time of the system clock will be described later.

The multiplexer 124 outputs the read data input to it via either of the signal line 127A or signal line 127B connected at the input side of it, based on a setting value R input from the delay command generating part 140. The output side of the multiplexer 124 is connected with the shift register 122.

Here, the delay part 113, the multiplexer 114, the delay part 123, and the multiplexer 124 are examples of a delay control part for controlling a delay time of data.

Also, the delay command generating part 140 and the delay part 113, the multiplexer 114, the delay part 123, and the multiplexer 124 as an example of a delay control part are an example of a delay setting part for setting a delay time of data.

The shift register 122 temporarily holds read data output via the multiplexer 124 to transmit it to the output terminal 121.

The output terminal 121 is a terminal for outputting read data from the memory controller 100, which is transmitted from the shift register 122. The output side of the output terminal 121 is connected with CPU0 to CPU3 (see FIG. 1) via the CPU controller 30.

The slew rate set command generating part 130 sets the value of the setting value D based on a control signal input from the SPD controller 150 to input the setting value D to the driver 103. As a result, the driver 103 is set with a slew rate of the address signal based on the setting value D input from the slew rate set command generating part 130. Namely, the slew rate of the address signal set at the driver 103 is determined by the value of the setting value D. For the slew rate set command generating part 130, for example, a combinational circuit can be used.

If the memory controller 100 is connected with RDIMMs 50, the slew rate set command generating part 130 sets the setting value D so that the slew rate of the address signal takes a relatively high value. In this case, the slew rate set command generating part 130 may set the setting value D so that the slew rate takes a maximum value.

Also, if the memory controller 100 is connected with UDIMMs 60, the slew rate set command generating part 130 sets the setting value D so that the slew rate of the address signal takes a relatively low value.

Namely, if the memory controller 100 is connected with UDIMMs 60, the slew rate set command generating part 130 sets the setting value D so that the slew rate of the address signal takes a lower value than when RDIMMs 50 are connected.

This is because address signal reflection is suppressed by setting the slew rate of the address signal low for UDIMMs 60 that have a higher possibility of generating a reflection problem than RDIMMs 50.

Here, if the memory controller 100 is connected with UDIMMs 60, the slew rate set command generating part 130 may set the setting value D so that the slew rate takes a minimum value.

Also, the slew rate set command generating part 130 sets slew rates for the clock, data strobe signal, and data in addition to the slew rate of the address signal. The slew rate set command generating part 130 may set the slew rates for the clock, data strobe signal, and data, for example, to maximum values.

The delay command generating part 140 sets the values of the setting value W and the setting value R based on a control signal input from the SPD controller 150 to input the setting value W and R to the multiplexer 114 and 124, respectively. Whether to select data via the delay parts 113 or 123 at the multiplexers 114 or 124, respectively, is determined by the setting values W and R output by the delay command generating part 140. For the delay command generating part 140, for example, a combinational circuit can be used.

Here, the memory controller 100 is generally usable for both RDIMM 50 and UDIMM 60 according to the present embodiment.

However, an RDIMM 50 includes a registered chip 5 whereas a UDIMM 60 does not include a registered chip, and an RDIMM 50 and a UDIMM 60 differ with address line topology.

Therefore, to make the memory controller 100 generally usable for both RDIMM 50 and UDIMM 60, it is necessary to adjust timing of an address signal and data.

According to the present embodiment, the delay command generating part 140 of the memory controller 100 changes the setting values W and R (H (High) or L (Low)) when reading data and when writing data if an RDIMM 50 is connected.

Similarly, the delay command generating part 140 changes the setting values W and R (H (High) or L (Low)) when reading data and when writing data if a UDIMM 60 is connected.

To make an RDIMM 50 and a UDIMM 60 generally connectable, the delay command generating part 140 sets the setting value R to L level when reading data if an RDIMM 50 is connected. This is because an address signal delay generated at the registered chip 55 does not cause a problem when reading data from the RDIMM 50.

This makes the multiplexer 124 select the signal line 127B, which does not give a delay to read data from the RDIMM 50.

Also, the delay command generating part 140 sets the setting value W to H level when writing data if an RDIMM 50 is connected.

This is to make the multiplexer 114 select the signal line 117A for giving the delay of one cycle time of the system clock (1τ) to the data at the delay part 113 when writing the data to the RDIMM 50, because the registered chip 55 gives the address signal the delay of 1τ, hence the timing is misaligned with the timing of the write data timing.

To align the timing of the address signal and the data when writing the data to the RDIMM 50 in this way, the delay time of the delay part 113 is set to the same time as the delay time (1τ) of the address signal at the registered chip 55.

Also, the delay command generating part 140 sets the setting value R to H level for data read if a UDIMM 60 is connected. This makes the multiplexer 124 select the signal line 127A, which gives a delay to read data from the UDIMM 60 at the delay part 123.

This is to align the timing between the RDIMM 50 and the UDIMM 60 because when reading data from the RDIMM 50, the registered chip 55 generates the delay on the address signal, which makes the data reach the memory controller 100 at timing later than the timing with the UDIMM 60.

To align the timing when reading data from the RDIMM 50 and the UDIMM 60 in this way, the delay time of the delay part 113 is set to the same time as the delay time (1τ) of the address signal at the registered chip 55.

Also, the delay command generating part 140 sets the setting value W to L level for data write if a UDIMM 60 is connected.

This is because a delay is not required to be given to data when writing the data because an address signal delay is not generated in a UDIMM 60 not including a registered chip. As a result, the multiplexer 114 selects the signal line 117B.

The input terminal 151 is connected with the SPD elements 59 of the RDIMMs 50A-50B, and receives data that represents specifications of the RDIMMs 50A-50B as input. The output side of the input terminal 151 is connected with the receiver 152.

The receiver 152 receives the data that represents specifications input from the terminal 151 to transmit the data to the SPD controller 150.

The SPD controller 150 is an example of a determination part that determines which DIMM, an RDIMM 50 or a UDIMM 60, is connected with the output terminal 104 and the input/output terminal 116, based on data input via the input terminal 151 and the receiver 152.

For the SPD controller 150, for example, a sequencer can be used. Here, as illustrated in FIG. 4 and FIG. 5, an RDIMM 50 and a UDIMM 60 have different address line topologies, hence data that represents specifications stored in the SPD element of an RDIMM 50 and the SPD element of a UDIMM 60 differ from each other.

Therefore, the SPD controller 150 reads data that represents specifications stored in the SPD element of an RDIMM 50 or a UDIMM 60, then based on a difference in address line topologies, determines which DIMM, an RDIMM 50 or a UDIMM 60, is connected with the output terminal 104 and the input/output terminal 116. Here, data that represents specifications stored in the SPD element of an RDIMM 50 or a UDIMM 60 will be described later with reference to FIG. 7A and FIG. 7B.

The initializing part 160 sets initial values to the setting values W and R of the slew rate set command generating part 130 and the setting value D of the delay command generating part 140 when the power source of the memory controller 100 is turned on.

Next, with reference to FIG. 7A and FIG. 7B, data that represents specifications stored in the SPD element of an RDIMM 50 or a UDIMM 60 will be described.

FIG. 7A is a schematic view illustrating a part of data that represents specifications stored in the SPD element of an RDIMM or a UDIMM, and FIG. 7B is a schematic view illustrating concrete examples of values for the data bits [3:0] illustrated in FIG. 7A.

The data illustrated in FIG. 7A and FIG. 7B is defined in JEDEC standard No. 21-C.

FIG. 7A is a schematic view illustrating a data structure of the data bits [7:0] with the byte address 3 (00000011) in the SPD element 59 (see FIG. 6). The data bits [7:0] with the byte address 3 (00000011) in the SPD element 59 includes data that indicates either of an RDIMM or a UDIMM.

Values of the data bits [3:0] in the data bits [7:0] are denoted as D3, D2, D1, and D0, respectively. Values other than the data bits [3:0] in the data bits [7:0] are undefined.

As illustrated in FIG. 7B, values of bits in data bits [3:0], or values of D3, D2, D1, and D0 are assigned with 0, 0, 0, and 1 for an RDIMM as illustrated in the second term. Also, D3, D2, D1, and D0 are assigned with 0, 0, 1, and 0 for a UDIMM as in the third term.

Here, the data of 0, 0, 0, and 0 for D3, D2, D1, and D0, respectively, as illustrated in the first term is undefined, and in FIG. 7B, the fourth term and the rest are omitted.

The SPD controller 150 determines which DIMM, an RDIMM 50 or a UDIMM 60, is connected with the output terminal 104 and the input/output terminal 116 based on the data illustrated in FIG. 7A and FIG. 7B.

Next, with reference to FIG. 8, an internal circuit of the driver 103 of the memory controller 100 will be described according to the embodiment.

Figure 8:
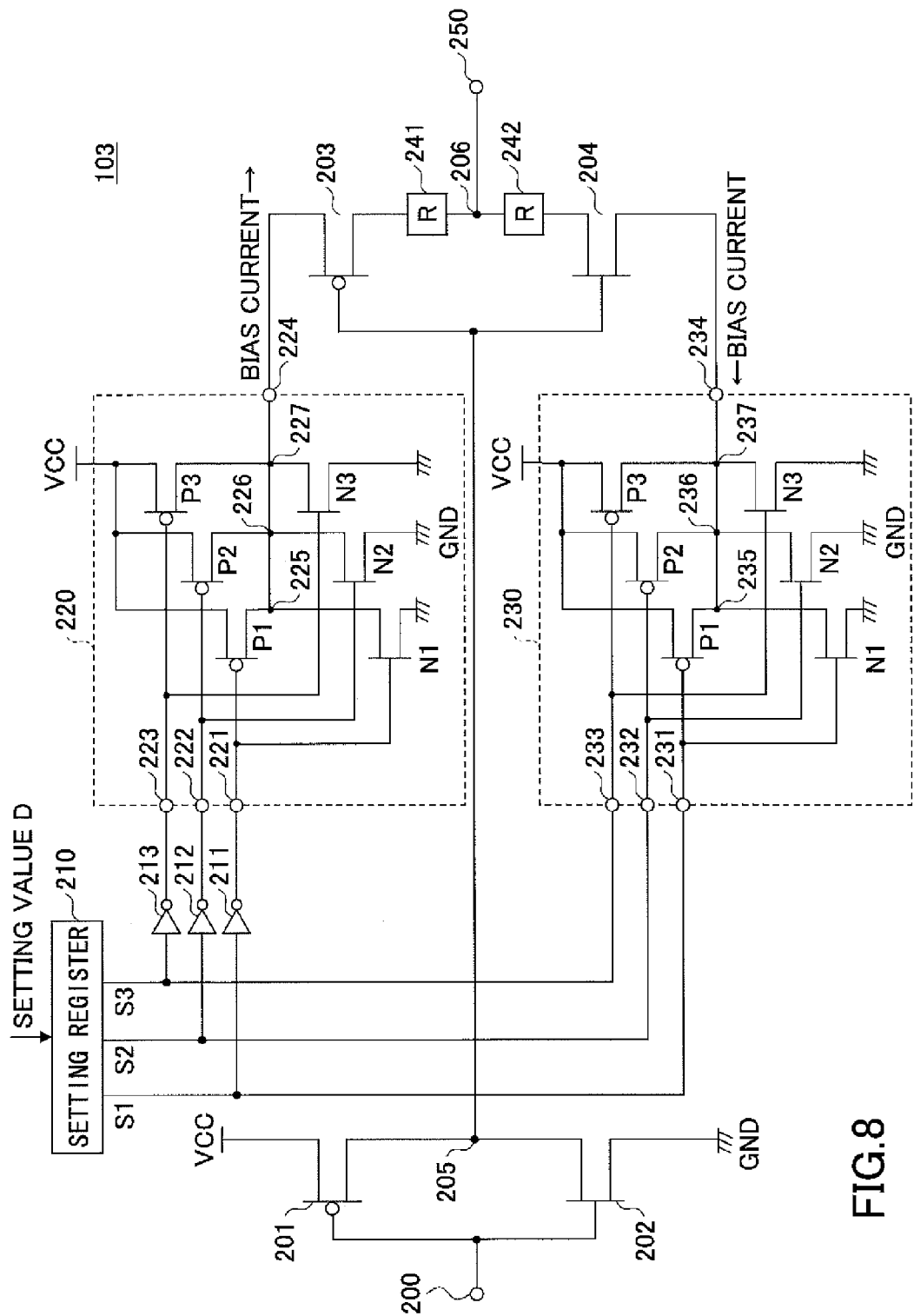
FIG. 8 is a schematic view illustrating a circuit of a driver 103 of a memory controller 100 according to an embodiment.

FIG. 8 is a schematic view illustrating a circuit of the driver 103 of the memory controller 100 according to the embodiment.

The driver 103 includes an input terminal 200, PMOS (P-type Metal Oxide Semiconductor) transistors 201 and 203, NMOS (N-type Metal Oxide Semiconductor) transistors 202 and 204, a setting register 210, inverters 211, 212, and 213, bias circuits 220 and 230, protective resistances 241 and 242, and an output terminal 250.

The input terminal 200 is the input terminal of the driver 103, and is connected with the output terminal of the shift register 102 (see FIG. 6). The input terminal 200 receives the address signal from the shift register 102 as input.

The PMOS transistor 201 and the NMOS transistor 202 configure a CMOS (Complementary Metal Oxide Semiconductor) circuit.

The gates of the PMOS transistor 201 and the NMOS transistor 202 are connected with the input terminal 200. The drain of the PMOS transistor 201 is connected with a power source (VCC), and the source is connected with the drain of the NMOS transistor 202. The source of the NMOS transistor 202 is grounded.

A connecting part 205 connecting the source of PMOS transistor 201 and the drain of the NMOS transistor 202 is connected with the gate of PMOS transistor 203 and the gate of the NMOS transistor 204. The connecting part 205 is an output part of the CMOS circuit including the PMOS transistor 201 and the NMOS transistor 202.

The PMOS transistor 203 and the NMOS transistor 204 configure a CMOS (Complementary Metal Oxide Semiconductor) circuit. The gate of the PMOS transistor 203 and the gate of NMOS transistor 204 are connected with the connecting part 205. The drain of the PMOS transistor 203 is connected with the output terminal 224 of the bias circuit 220, and the source is connected with the drain of the NMOS transistor 204 via the protective resistances 241 and 242.

The source of the NMOS transistor 204 is connected with the input terminal 234 of the bias circuit 230. A connection point 206 of the protective resistances 241 and 242 that are connected between the source of the PMOS transistor 203 and the drain of the NMOS transistor 204, is connected with the output terminal 250 of the driver 103.

Here, if the address signal input to the input terminal 200 is "1", the PMOS transistor 201 becomes off and the NMOS transistor 202 becomes on. Therefore, the potential of the connecting part 205 becomes ground potential.

As a result, the PMOS transistor 203 becomes on and the NMOS transistor 204 becomes off.

If one of the PMOS transistors P1, P2, and P3 in the bias circuit 220 becomes on at this moment, a bias current with a predetermined current value flows from the bias circuit 220 to the PMOS transistor 203.

In this way, if the address signal of "1" is input to the input terminal 200, the PMOS transistor 203 becomes on, and the bias current with the predetermined current value is output from the bias circuit 220, a current is output from the output terminal 250 via the PMOS transistor 203 and the protective resistance 241.

This makes the potential of the output terminal 250 take a higher potential than a potential representing the boundary of "1"/"0" for the address signal, which makes the address signal of "1" be output from the output terminal 250.

On the other hand, if the address signal input to the input terminal 200 is "0", the PMOS transistor 201 becomes on and the NMOS transistor 202 becomes off. Therefore, the potential of the connecting part 205 becomes the potential of the power source (VCC).

As a result, the PMOS transistor 203 becomes off and the NMOS transistor 204 becomes on.

If one of the NMOS transistors N1, N2, and N3 in the bias circuit 230 becomes on at this moment, a bias current flows from the NMOS transistor 204 to the bias circuit 230.

In this way, if the address signal of "0" is input to the input terminal 200, the NMOS transistor 204 becomes off, and the bias current with the predetermined current value flows into the bias circuit 230, a current flows from the output terminal 250 via the NMOS transistor 204 and the protective resistance 242.

This makes the potential of the output terminal 250 take a lower potential than a potential representing the boundary of "1"/"0" for the address signal, which makes the address signal of "0" be output from the output terminal 250.

As above, the address signal of "1" or "0" is output from the driver 103 via the output terminal 250.

Next, the setting register 210 and a circuit configuration of the bias circuits 220 and 230 will be described.

The setting register 210 has a 3-bit data area and the 3-bit data area holds data S1, S2, and S3, respectively. The setting register 210 receives the 3-bit setting value D from the slew rate set command generating part 130 (see FIG. 6) as input. When the setting value D is input to the setting register 210, it is held as data S1, S2, and S3.

The data S1, S2, and S3 held in the data area of the setting register 210 are input to the bias circuit 220 via the inverters 211, 212, and 213, and are input directly to the bias circuit 230.

Although the bias circuit 220 and the bias circuit 230 have the same circuit configuration, the bias circuit 220 is used for outputting data "1" for the address signal, and the bias circuit 230 is used for outputting data "0" for the address signal.

As described above, the bias circuit 220 and the bias circuit 230 differ in directions of the bias currents flowing between them and the output terminal 250. Between the bias circuit 220 and the output terminal 250, the current flows from the bias circuit 220 to the output terminal 250. On the other hand, between the bias circuit 230 and the output terminal 250, the current flows from the output terminal 250 to the bias circuit 220.

The bias circuit 220 includes PMOS transistors P1, P2, and P3, NMOS transistors N1, N2, and N3, input terminals 221, 222, and 223, and an output terminal 224. The PMOS transistors P1, P2, and P3 and the NMOS transistors N1, N2, and N3 configure CMOS circuits which are respectively configured with P-type and N-type transistors having the same suffix numbers.

The input terminals 221, 222, and 223 are connected with the output terminals of the inverters 211, 212, and 213, respectively. The input terminals 221, 222, and 223 receive the data S1, S2, and S3 output from the setting register 210, which are inverted by the inverters 211, 212, and 213, as input, respectively.

The gate of the PMOS transistor P1 and the gate of the NMOS transistor N1 are connected with the output terminal of the inverter 211 via the input terminal 221. Similarly, the gate of the PMOS transistor P2 and the gate of the NMOS transistor N2 are connected with the output terminal of the inverter 212 via the input terminal 222. Also, the gate of the PMOS transistor P3 and the gate of the NMOS transistor N3 is connected with the output terminal of the inverter 213 via the input terminal 223.

The drains of the PMOS transistors P1, P2, and P3 are connected with the power source (VCC). The sources of the PMOS transistors P1, P2, and P3 are connected with the drains of the NMOS transistors N1, N2, and N3, respectively. The sources of the NMOS transistors N1, N2, and N3 are grounded. Here, connecting parts between the sources of the PMOS transistors P1, P2, and P3 and the drains of the NMOS transistors N1, N2, and N3 are defined as the connecting parts 225, 226, and 227, respectively.

The connecting parts 225, 226, and 227 are all connected with the drain of the PMOS transistor 203 via the output terminal 224.

If the bias circuit 220 as above receives the data S1, S2, and S3 of "1", "1", and "1" via the inverters 211, 212, and 213 as input, the PMOS transistors P1, P2, and P3 become on, and the NMOS transistors N1, N2, and N3 become off.

Therefore, a bias current flows from the PMOS transistors P1, P2, and P3, via the connecting parts 225, 226, and 227, to the PMOS transistor 203.

Also, if the bias circuit 220 receives the data S1, S2, and S3 of "0", "0", and "0" as input, the PMOS transistors P1, P2, and P3 become off, and the NMOS transistors N1, N2, and N3 become on. Therefore, a bias current is not supplied to the PMOS transistor 203.

Therefore, by setting at least one of the data S1, S2, and S3 to "1", the corresponding one of the PMOS transistors P1, P2, or P3 to the data "1" becomes on, from which a bias current is supplied to the PMOS transistor 203.

By increasing the number of data of "1" among the data S1, S2, and S3, the number of the "on" PMOS transistors among P1, P2, and P3 increases, which makes the current value of the bias current output from the bias circuit 220 greater.

Here, the PMOS transistors P1, P2, and P3 and the NMOS transistors N1, N2, and N3 in the bias circuit 220 have predetermined size ratios so that the value of a bias current changes in stages by incrementing the value of the 3-bit data S1, S2, and S3.

The size ratios of the PMOS transistors P1, P2, and P3 and the size ratios of the NMOS transistors N1, N2, and N3 in the bias circuit 220 will be described later.

Also, the bias circuit 230 includes PMOS transistors P1, P2, and P3, and NMOS transistors N1, N2, and N3, and input terminals 231, 232, 233, and 234. The PMOS transistors P1, P2, and P3 and the NMOS transistors N1, N2, and N3 configure CMOS circuits which are respectively configured with P-type and N-type transistors having the same suffix numbers.

The input terminals 231, 232, and 233 directly receive the data S1, S2, and S3 held in the data area of the setting register 210, respectively, as input.

The gate of the PMOS transistor P1 and the gate of the NMOS transistor N1 receive the data S1 from the setting register 210 via the input terminal 231 as input. Similarly, the gate of the PMOS transistor P2 and the gate of the NMOS transistor N2 receive the data S2 from the setting register 210 via the input terminal 232 as input. Also, the gate of the PMOS transistor P3 and the gate of the NMOS transistor N3 receive the data S3 from the setting register 210 via the input terminal 233 as input.

The drains of the PMOS transistors P1, P2, and P3 are connected with the power source (VCC). The sources of the PMOS transistors P1, P2, and P3 are connected with the drains of the NMOS transistors N1, N2, and N3, respectively. The sources of the NMOS transistors N1, N2, and N3 are grounded. Here, connecting parts between the sources of the PMOS transistors P1, P2, and P3 and the drains of the NMOS transistors N1, N2, and N3 are defined as the connecting parts 235, 236, and 237, respectively.

The connecting parts 235, 236, and 237 are all connected with the drain of the PMOS transistor 204 via the output terminal 234.

The bias circuit 230 is used for outputting the address signal of "0" as described above. With a current flowing from the output terminal 250 to the bias circuit 230, the potential of the output terminal 250 is reduced, which makes the address signal output from the output terminal 250 become "0".

If the bias circuit 230 as above receives the data S1, S2, and S3 of "1", "1", and "1" as input, the PMOS transistors P1, P2, and P3 become off, and the NMOS transistors N1, N2, and N3 become on.

Therefore, the NMOS transistor 204 is grounded via the NMOS transistors N1, N2, and N3 and the connecting parts 235, 236, and 237. If the NMOS transistor 204 becomes on at this moment, a bias current flows into the bias circuit 220 from the output terminal 250 via the protective resistance 242 and the NMOS transistor 204.

Also, if the bias circuit 230 as above receives the data S1, S2, and S3 of "0", "0", and "0" as input, the PMOS transistors P1, P2, and P3 become on, and the NMOS transistors N1, N2, and N3 become off. If the NMOS transistor 204 becomes on at this moment, a bias current does not flow into the bias circuit 230.

Therefore, by setting at least one of the data S1, S2, and S3 to "1", the corresponding one of the NMOS transistors N1, N2, or N3 to the data "1" becomes on, via which a bias current flows from the output terminal 250 to the bias circuit 230.

By increasing the number of data of "1" among the data S1, S2, and S3, the number of the "on" NMOS transistors among N1, N2, and N3 increases, which makes the current value of the bias current flowing into the bias circuit 230 greater.

Here, the PMOS transistors P1, P2, and P3 and the NMOS transistors N1, N2, and N3 in the bias circuit 230 have predetermined size ratios so that the value of a bias current changes in stages by incrementing the value of the 3-bit data S1, S2, and S3.

The size ratios of the PMOS transistors P1, P2, and P3 and the size ratios of the NMOS transistors N1, N2, and N3 in the bias circuit 230 will be described later.

Here, the relationship of connections between the drains and the sources of the PMOS transistors 201 and 203 and the NMOS transistors 202 and 204 in FIG. 8 may be opposite to the above relationship of connections.

Similarly, the relationship of connections between the drains and the sources of the PMOS transistors P1, P2, and P3 and the NMOS transistors N1, N2, and N3 in the bias circuits 220 and 230 may be opposite to the above relationship of connections.

Next, a relationship between a bias current of the bias circuits 220 and 230 illustrated in FIG. 8 and the slew rate of the address signal output from the output terminal 250 will be described.

According to the present embodiment, the memory controller 100 controls the slew rate of the address signal with the data "1" by controlling the current value of the bias current supplied from the bias circuit 220 to the PMOS transistor 203 illustrated in FIG. 8.

Also, the memory controller 100 controls the slew rate of the address signal with the data "0" by controlling the current value of the bias current flowing into the bias circuit 230 from the NMOS transistor 204 illustrated in FIG. 8.

To control the slew rate of the address signal, parasitic capacitances of the PMOS transistor 203 and the NMOS transistor 204 are utilized.

Here, a relationship between a drain-source current I and an output voltage V output from the drain or the source of a transistor with a parasitic capacitance C is represented as $V=(1/C) \times (dI/dt)$, where t represents time.

Therefore, in a case where C takes a fixed value, if the current I is greater, rise and fall of the output voltage V become faster, or if the current I is smaller, rise and fall of the output voltage V become slower. Namely, if the value of the current I is set to take several values, it is possible to adjust pace of rise and fall of the current I flowing through the transistor.

By setting the value of the bias current of the PMOS transistor 203 and the NMOS transistor 204 in the bias circuits 220 and 230, the memory controller 100 sets the slew rate of the address signal output from the output terminal 250 via the PMOS transistor 203 and the NMOS transistor 204.

Next, a relationship among size ratios of the PMOS transistors P1, P2, and P3 and the NMOS transistors N1, N2, and N3 in the bias circuits 220 and 230, the data S1, S2, and S3 in the setting register 210, and the bias current in the bias circuits 220 and 230 will be described.

FIG. 9 is a schematic view illustrating a relationship between the data S1, S2, and S3 of the setting register 210, the bias current of the bias circuits 220 or 230, and the slew rate of the address signal in the memory controller 100 according to the present embodiment.

The data S1, S2, and S3 of the setting register 210 may take values from "0", "0", and "0" to "1", "1", and "1" as illustrated in FIG. 9.

If, however, the data S1, S2, and S3 are "0", "0", and "0", all the PMOS transistors P1 to P3 in the bias circuit 220 become off, and all the NMOS transistors N1 to N3 in the bias circuit 230 become off, hence the bias currents do not flow in both of the bias circuits 220 and 230.

Therefore, if the data S1, S2, and S3 are "0", "0", and "0", the address signal cannot be output.

Therefore, it is assumed that the case of data S1, S2, and S3 with "0", "0", and "0" is not be used in the setting register 210.

Size ratios of the PMOS transistors P1, P2, and P3 and the NMOS transistors N1, N2, and N3 in the bias circuits 220 and 230 are set, as illustrated with from the second term to the eighth term in FIG. 9, so that the bias current becomes greater when the data S1, S2, and S3 are set to the value "1" in order from the lower bit S3.

Size ratios of the PMOS transistors P1 to P3 may be set by, for example, setting the gate length or gate width of the PMOS transistors P1 to P3.

Similarly, size ratios of the NMOS transistors N1 to N3 may be set by, for example, setting the gate length or gate width of the NMOS transistors N1 to N3.

Here, as described above, the slew rate of the address signal output from the output terminal 250 (see FIG. 8) changes in response to the current value of the bias current flowing in the bias circuits 220 and 230.

Therefore, as illustrated in FIG. 9, if the size ratios of the PMOS transistors P1, P2, and P3 and the NMOS transistors N1, N2, and N3 are set so that the bias current increases successively when the data S1, S2, and S3 are set to "1" in order from the lower bit S3, it is possible to set the slew rate of the address signal to increase successively.

The current value of the bias current of the bias circuits 220 and 230 is minimum when the data S1, S2, and S3 of the setting register 210 are "0", "0", and "1". The slew rate is also minimum in this case.

Also, the current value of the bias current of the bias circuits 220 and 230 is maximum when the data S1, S2, and S3 of the setting register 210 are "1", "1", and "1". The slew rate is also maximum in this case.

Next, with reference to FIG. 10A and FIG. 10B, a difference of slew rates of the address signal will be described.

Figure 10A:
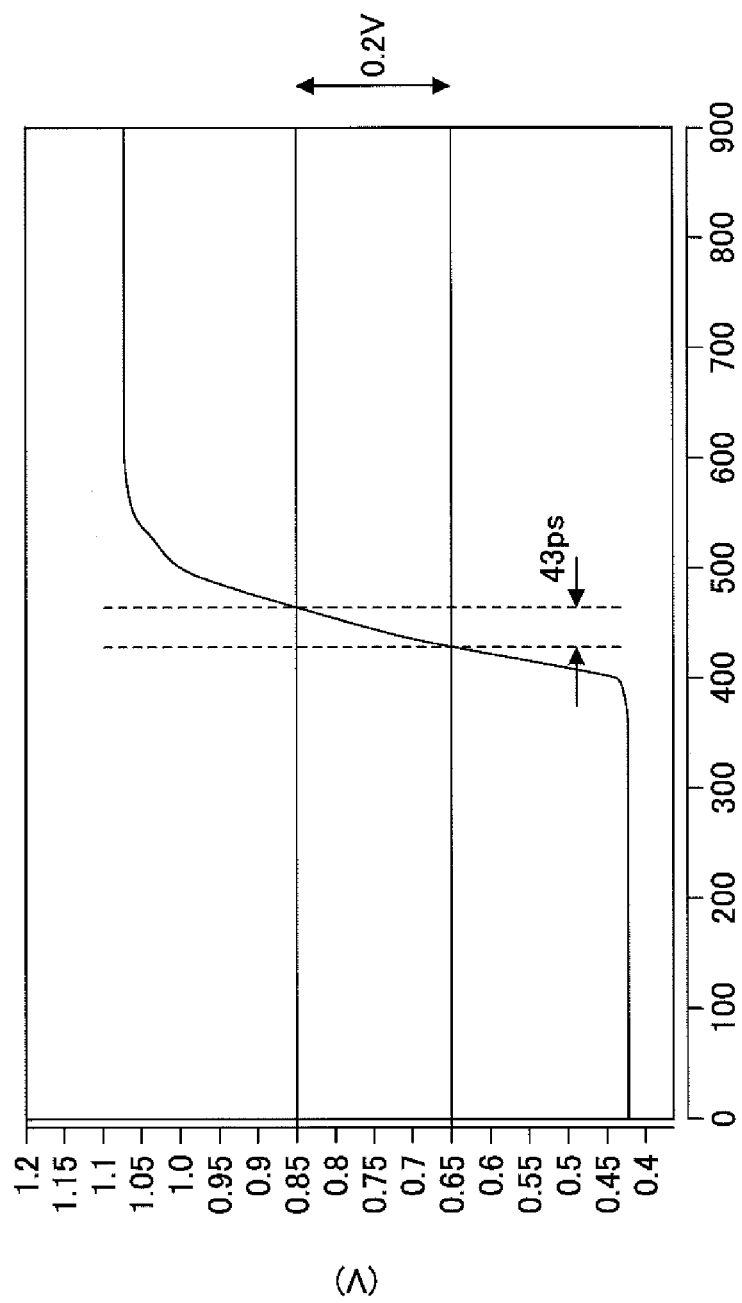
FIG. 10A is a schematic view illustrating a simulation result of a rising waveform of an address signal when a slew rate is set to a maximum in a memory controller 100 according to an embodiment.

FIG. 10A is a schematic view illustrating a simulation result of a rising waveform of the address signal when the slew rate is set to the maximum in the memory controller 100 according to the present embodiment.

FIG. 10B is a schematic view illustrating a simulation result of a rising waveform of the address signal when the slew rate is set to the minimum in the memory controller 100 according to the present embodiment.

Here, evaluation of the slew rates of the address signal illustrated in FIG. 10A and FIG. 10B is executed by calculating a time for the voltage to increase by just 0.2 V from 0.65 V to 0.85 V.

The threshold value representing the boundary between "0" and "1" of the address signal in an RDIMM and a UDIMM is defined as 0.75 V in JEDEC standards, and the variation of the threshold is also defined that the lower limit value is 0.65 V and the upper limit value is 0.85 V.

Therefore, the evaluation of the slew rates is executed by calculating a time for the voltage to increase from 0.65 V to 0.85 V.

The slew rate of the rise of the address signal illustrated in FIG. 10A is 4.65 V/ns (nanosecond) because the voltage rises by 0.2 V from 0.65 V to 0.85 V in 43 ps (picosecond).

The slew rate of the rise of the address signal illustrated in FIG. 10B is 1.8 V/ns because the voltage rises by 0.2 V from 0.65 V to 0.85 V in 110 ps.

The memory controller 100 sets, as an example, the slew rate of the address signal to the maximum value, as illustrated in FIG. 10A, by setting the data S1, S2, and S3 of the setting register 210 to "1", "1", and "1" (the eighth term illustrated in FIG. 9) according to the present embodiment.

Also, the memory controller 100 sets, as an example, the slew rate of the address signal to the minimum value, as illustrated in FIG. 10B, by setting the data S1, S2, and S3 of the setting register 210 to "0", "0", and "1" (the second term illustrated in FIG. 9) according to the present embodiment.

Also, the memory controller 100 sets the slew rate of the address signal to a value between the values illustrated in FIG. 10A and FIG. 10B by setting the data S1, S2, and S3 of the setting register 210 to values between "1", "1", and "1" and "0", "0", and "1" (the third to seventh terms illustrated in FIG. 9) according to the present embodiment.

Next, with reference to FIG. 11 and FIG. 12, eye patterns of the address signal received by SDRAM1 and SDRAM8 of a UDIMM 60 will be described when the slew rate of the address signal is set to the maximum or the minimum.

Figure 11A:
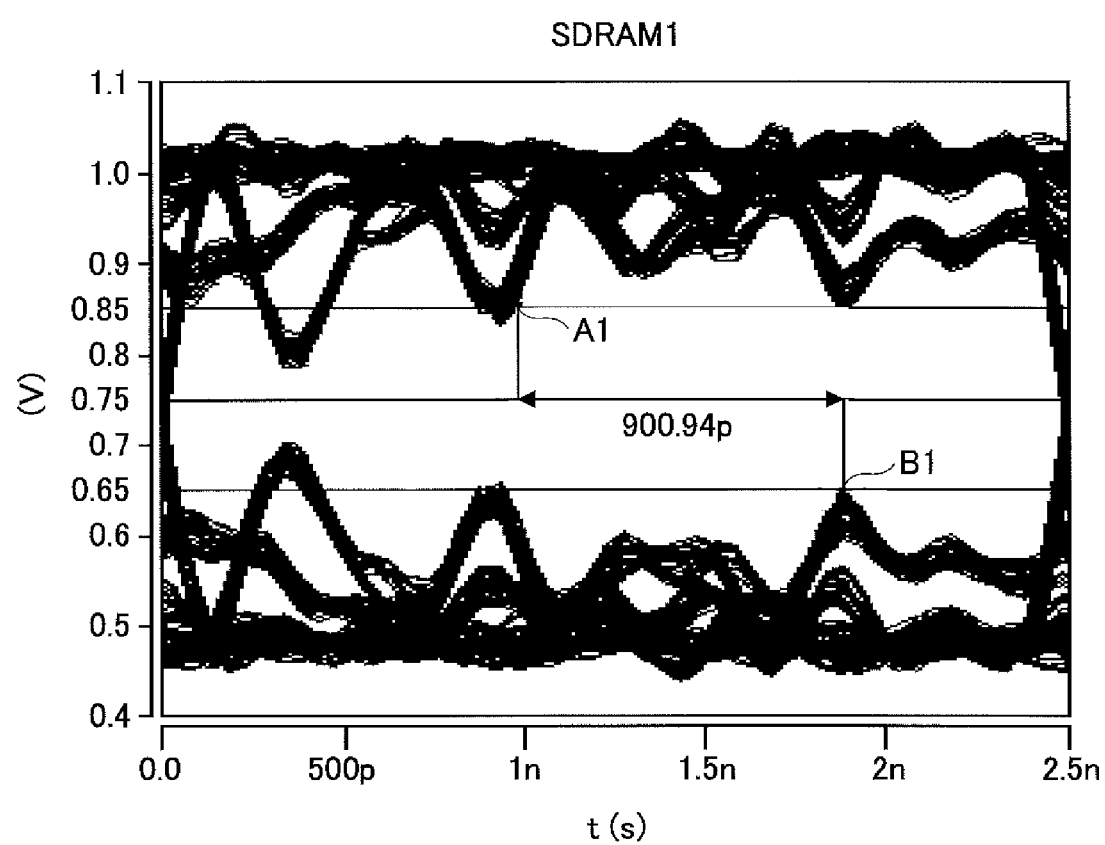
FIG. 11A is a schematic view illustrating an eye pattern of an address signal received by SDRAM1 of a UDIMM 60 when a slew rate of an address signal is set to a maximum.
Figure 11B:
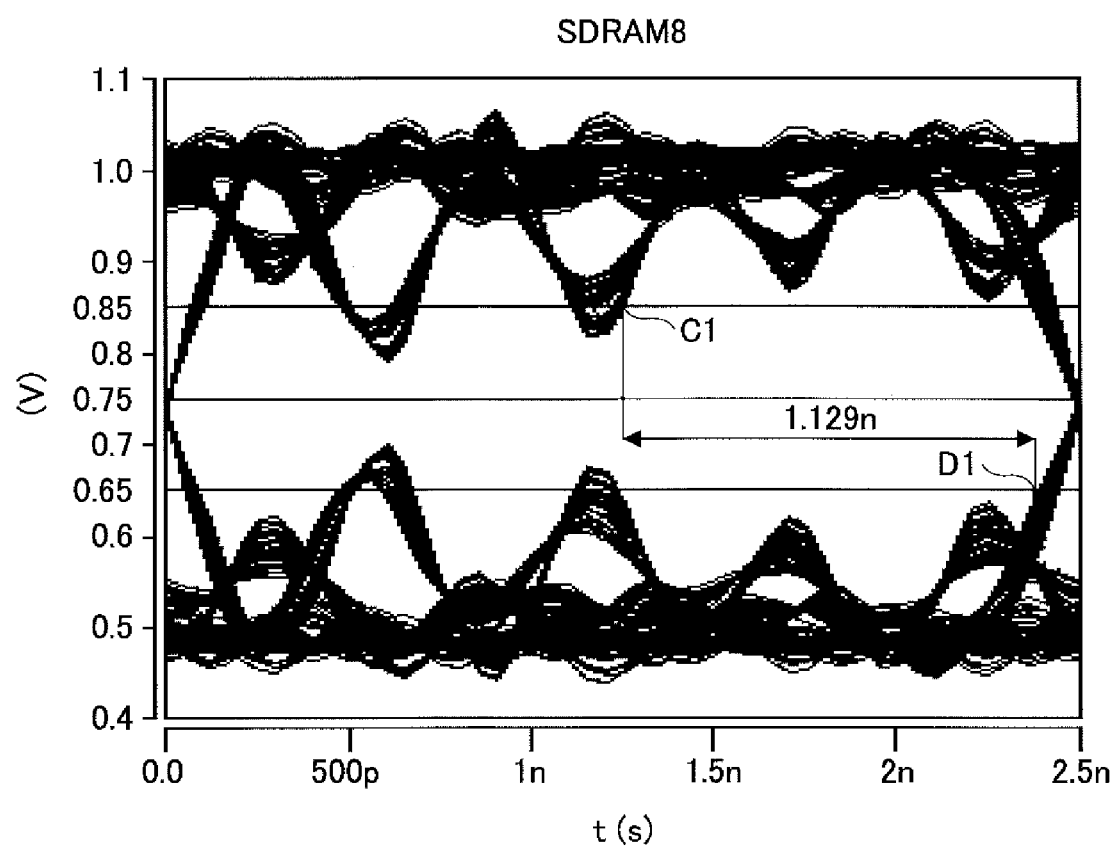
FIG. 11B is a schematic view illustrating an eye pattern of an address signal received by SDRAM8 of a UDIMM 60 when a slew rate of an address signal is set to a maximum.

FIG. 11A is a schematic view illustrating an eye pattern of the address signal received by SDRAM1 of the UDIMM 60 when the slew rate of the address signal is set to the maximum, and FIG. 11B is a schematic view illustrating an eye pattern of the address signal received by SDRAM8 of the UDIMM 60 when the slew rate of the address signal is set to the maximum.

Figure 12A:
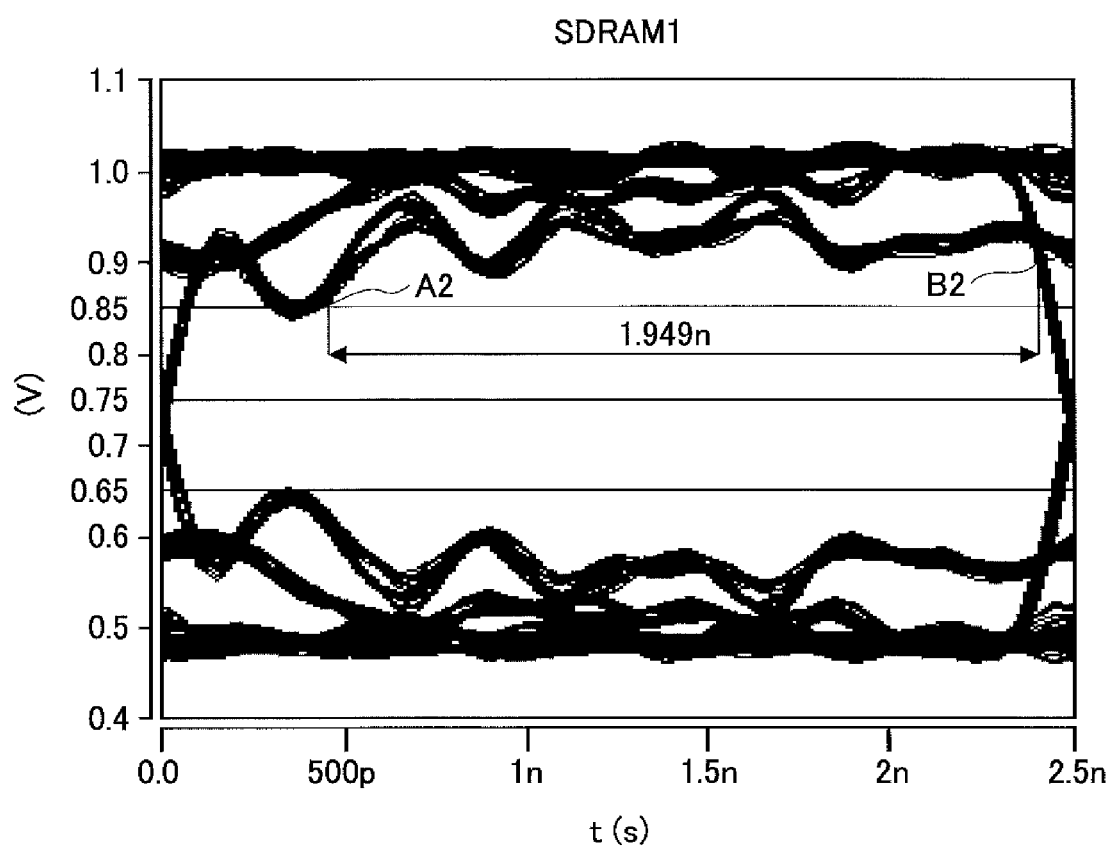
FIG. 12A is a schematic view illustrating an eye pattern of an address signal received by SDRAM1 of a UDIMM 60 when a slew rate of an address signal is set to a minimum.
Figure 12B:
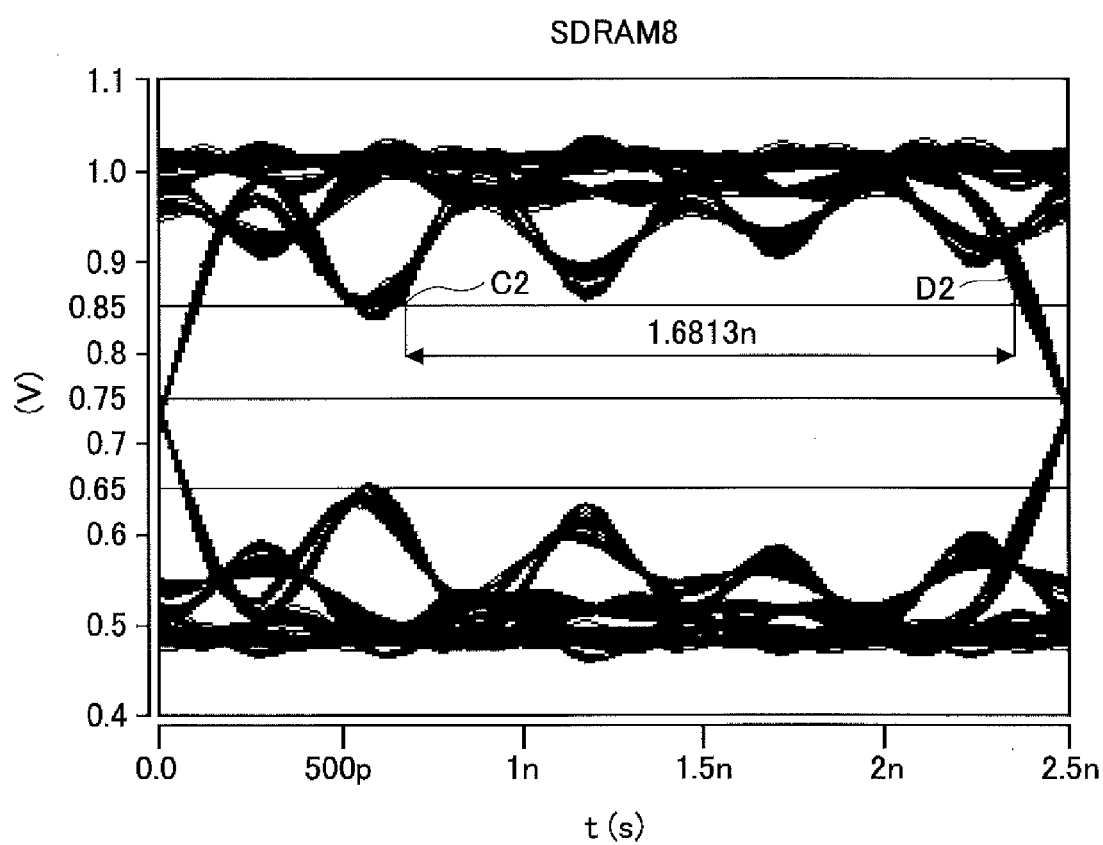
FIG. 12B is a schematic view illustrating an eye pattern of an address signal received by SDRAM 8 of a UDIMM 60 when a slew rate of an address signal is set to a minimum.

FIG. 12A is a schematic view illustrating an eye pattern of the address signal received by SDRAM1 of the UDIMM 60 when the slew rate of the address signal is set to the minimum. FIG. 12B is a schematic view illustrating an eye pattern of the address signal received by SDRAM8 of the UDIMM 60 when the slew rate of the address signal is set to the minimum.

In FIG. 11A, FIG. 11B, FIG. 12A, and FIG. 12B, the horizontal axis represents time, and the vertical axis represents voltage for illustrating eye patterns.

Here, also calculated is an effective window width between the lower limit value (0.65 V) and the upper limit value (0.85 V) of the threshold value representing the boundary between "0" and "1" of the address signal of the RDIMM and UDIMM.

With the eye pattern illustrated in FIG. 11A, an effective window width of 900.94 ps is found between a point A1 and a point B1. Also, with the eye pattern illustrated in FIG. 11B, an effective window width of 1.129 ns is found between a point C1 and a point D1.

FIG. 11A and FIG. 11B illustrate the eye patterns when the slew rate of the address signal for an RDIMM 50 is input to the UDIMM 60.

Therefore, the eye pattern of SDRAM8 (FIG. 11B), which is positioned innermost (see FIG. 5) with respect to the input terminal 62 has a narrower effective window width than the eye pattern of SDRAM1 (FIG. 11A) positioned closest to the input terminal 62.

This implies that an influence of address signal reflection appears more noticeably at SDRAM1 positioned closer to the input terminal 62 than SDRAM8 positioned innermost with respect to input terminal 62.

On the other hand, the eye patterns with setting the slew rate of the address signal to the minimum are those as illustrated in FIG. 12A and FIG. 12B.

With the eye pattern illustrated in FIG. 12A, an effective window width of 1.949 ns is found between a point A2 and a point B2. Also, with the eye pattern illustrated in FIG. 12B, an effective window width of 1.6813 ns is found between a point C2 and a point D2.

In this way, when the address signal is input to the UDIMM 60 with setting the slew rate of the address signal to the minimum, the effective window width of SDRAM1 closest to the input terminal 62 is widened more than two times greater than the eye pattern illustrated in FIG. 11A.

Also, the effective window width of SDRAM8 positioned innermost with respect to the input terminal 62 is widened more than 1.5 times greater than the eye pattern illustrated in FIG. 11B.

As above, it was found that an influence of address signal reflection can be reduced if the address signal is input to the UDIMM 60 with reducing the slew rate of the address signal.

Next, with reference to FIG. 13, a procedure executed by the memory controller 100 will be described, if connected with an RDIMM 50 or a UDIMM 60.

Figure 13:
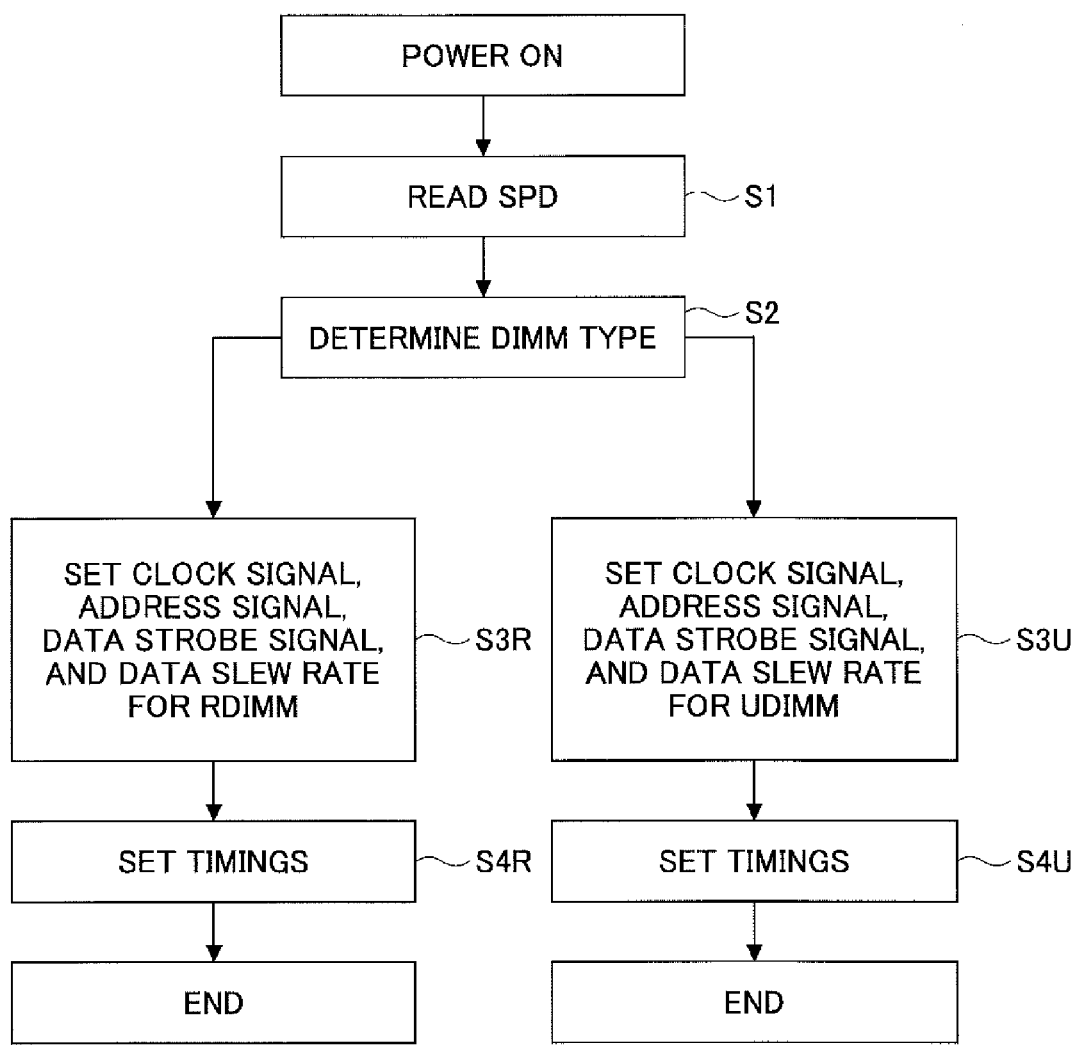
FIG. 13 is a schematic view illustrating a procedure executed by an SPD controller 150 of a memory controller 100 if an RDIMM 50 or a UDIMM 60 is connected with the memory controller 100 according to an embodiment.

FIG. 13 is a schematic view illustrating the procedure executed by the SPD controller 150 of the memory controller 100 when an RDIMM 50 or a UDIMM 60 is connected with the memory controller 100 according to the present embodiment.

The SPD controller 150 starts the procedure when the power source of the memory controller 100 is turned on, by reading data stored in the SPD element (Step S1).

Next, the SPD controller 150 determines the type of a DIMM based on the data read from the SPD element (Step S2).

If determining at Step S2 that the memory controller 100 is connected with an RDIMM 50, the SPD controller 150 makes the slew rate set command generating part 130 set the slew rates of the clock, address signal, data strobe signal, and data to the values for an RDIMM (Step S3R).

Consequently, the slew rate set command generating part 130 sets the slew rates of the clock, data strobe signal, and data to the maximum value (max), and sets the slew rates of the address signal to the value for an RDIMM (a relatively high value) in response to the value held in the initializing part 160.

After completing the processing of Step S3R, the memory controller 100 executes timing setting of the clock, address signal, data strobe signal, and data (Step 4R).

That brings the procedure to the end.

On the other hand, if determining at Step S2 that the memory controller 100 is connected with a UDIMM 60, the SPD controller 150 makes the slew rate set command generating part 130 set the slew rates of the clock, address signal, data strobe signal, and data to the values for a UDIMM (Step S3R).

Consequently, the slew rate set command generating part 130 sets the slew rates of the clock, data strobe signal, and data to the maximum value (max), and sets the slew rates of the address signal to the value for a UDIMM (a relatively low value) in response to the value held in the initializing part 160.

After completing the processing of Step S3U, the memory controller 100 executes timing setting of the clock, address signal, data strobe signal, and data (Step 4U).

That brings the procedure to the end.

Next, with reference to a truth table in FIG. 14, behavior of the SPD controller 150 of the memory controller 100 will be described according to the present embodiment.

FIG. 14 is a schematic view illustrating a truth table illustrating behavior of the slew rate set command generating part 130 and the delay command generating part 140 of the memory controller 100 according to the present embodiment.

In FIG. 14, default initial values ranging from the first term to the eighth term are illustrated as inputs to the slew rate set command generating part 130 and the delay command generating part 140, along with outputs from the SPD controller 150 (determination results).

The default initial values are values represented with 2-bit data held by the initializing part 160 (see FIG. 6), whose values may be "00", "01", "10", or "11".

The default initial values are values used for finely adjusting the slew rate of the address signal. The slew rate of the address signal for a UDIMM 60 is set to take the minimum value if the default initial value is "00", and to take greater slew rate values when shifting from "00" to "11".

Also, the slew rate of the address signal for an RDIMM 50 is set to take the maximum value if the default initial value is "00", and to take greater slew rate values when shifting from "00" to "11".

The default initial values may be determined, for example, before an RDIMM 50 or a UDIMM 60 is connected with the memory controller 100, by adjusting the slew rate of the address signal for an RDIMM 50 or a UDIMM 60 while monitoring with an oscilloscope or the like based on characteristics of a waveform, to set it into the initializing part 160 beforehand.

Especially, a UDIMM 60 not including a registered chip has address signal reflection on the internal address line 61 (see FIG. 5), hence optimal default initial values may be determined based on an individual difference.

Also illustrated in FIG. 14 are the setting value D set by the slew rate set command generating part 130, and the setting values R and W set by the delay command generating part 140. The setting value D is 3-bit data, held as the data S1, S2, and S3 when input to the setting register 210 of the driver 103 (see FIG. 6).

Also illustrated in FIG. 14 is a relationship between the setting values R, W, and D and the slew rate with the first term to the eighth term.

As described above, the slew rate set command generating part 130 sets the 3-bit setting value D for setting the data S1, S2, and S3 of the setting register 210. Also, as illustrated in FIG. 9, the data S1, S2, and S3 of the setting register 210 change from "0", "0", and "1" to "1", "1", and "1".

Therefore, the slew rate set command generating part 130 changes the setting value D from "001" to "111".

Also, as described above, the delay command generating part 140 sets the setting value R to L level when reading data from an RDIMM 50, and sets the setting value W to H level when writing data to an RDIMM 50.

The delay command generating part 140 sets the setting value R to H level when reading data from a UDIMM 60, and sets the setting value W to L level when writing data to a UDIMM 60.

Therefore, the setting value D set by the slew rate set command generating part 130, and the setting values R and W set by the delay command generating part 140 are set from the first term to the eighth term as illustrated in FIG. 14.

The first term to the fourth term correspond to cases where the SPD controller 150 determines that an RDIMM 50 is connected.

In these cases, in response to the default initial values ("00" to "11"), the setting value D changes from the first term to the fourth term, or from "111" to "100", which reduces the slew rate in stages.

Here, from the first term to the fourth term, the setting value R is set to L level, and the setting value W is set to H level, respectively.

Also, the eighth term to the fifth term correspond to cases where the SPD controller 150 determines that a UDIMM 60 is connected.

In these cases, in response to the default initial values ("00" to "11"), the setting value D changes from the eighth term to the fifth term, or from "001" to "100", which increases the slew rate in stages.

Here, the eighth term to the fifth term, the setting value R is set to H level, and the setting value W is set to L level, respectively.

With the memory controller 100 according to the present embodiment, by using the default initial values, the setting value D set by the slew rate set command generating part 130, and the setting values R and W set by the delay command generating part 140 illustrated in FIG. 14, it is possible to make general use of an RDIMM 50 and a UDIMM 60.

Also, especially for the case where the memory controller 100 is connected with a UDIMM 60, the slew rate of the address signal is set relatively low, hence it is possible to suppress generation of address signal reflection on the address line 61 of the UDIMM 60.

Also, it is not necessary to provide separate memory controllers for an RDIMM 50 and a UDIMM 60 as conventionally done because the memory controller 100 can make general use of an RDIMM 50 and a UDIMM 60.

Thus, it is possible to provide a memory controller 100 that can be used for an RDIMM 50 with a reduced cost.

As a result, it is possible to reduce costs of large information processing apparatuses such as a blade server equipped with RDIMMs 50.

As described above, according to the present embodiment, it is possible to provide a memory controller and an information processing apparatus that can correctly execute address specification and read/write of data with either of the DIMMs having different topologies of the address lines, as well as with reduced manufacturing cost.

Here, in the above, although the embodiment is described in that the slew rate of the address signal is set in stages between the maximum value and the minimum value in response to the default initial values held by the initializing part 160, the slew rate of the address signal may be set fixed to the maximum value if the memory controller 100 is connected with an RDIMM 50.

Similarly, the slew rate of the address signal may be set fixed to the minimum value if the memory controller 100 is connected with a UDIMM 60.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A memory controller comprising:
   a first terminal connected to a Dual Inline Memory Module (DIMM) and configured to output an address signal to the DIMM;
   a second terminal connected to the DIMM;
   a first transmission line connected to the second terminal and configured to transmit first data to be written to the DIMM;
   a second transmission line connected to the second terminal and configured to transmit second data read from the DIMM;
   a determination part configured to determine a type of the DIMM having a specific address line topology, the determination being made based on Serial Presence Detection (SPD) of the DIMM;
   a slew rate setting part configured to set a slew rate of the address signal based on the type of the DIMM determined by the determination part, the slew rate setting part setting a first slew rate of the address signal input to a Registered Dual Inline Memory Module (RDIMM) lower than a second slew rate of the address signal input to an Unbuffered Dual Inline Memory Module (UDIMM) in a case where the type of the DIMM determined by the determination part is an RDIMM, the slew rate setting part setting the second slew rate of the address signal in a case where the type of the DIMM determined by the determination part is a UDIMM;
   a delay command generating part configured to generate a delay command for setting a delay time based on the type of the DIMM determined by the determination part;
   a first delay control part inserted in series into the first transmission line and configured to control the delay time in response to the delay command generated by the delay command generating part and to delay the first data by the delay time when writing the first data in a case where the type of the DIMM determined by the determination part is an RDIMM; and
   a second delay control part inserted in series into the second transmission line and configured to control the delay time in response to the delay command generated by the delay command generating part and to delay the second data by the delay time when reading the second data in a case where the type of the DIMM determined by the determination part is a UDIMM.

2. The memory controller as claimed in claim 1, wherein the slew rate setting part includes
   a slew rate set command generating part configured to generate a slew rate set command for setting the slew rate of the address signal based on the type of the DIMM determined by the determination part, and
   a slew rate change part configured to change the slew rate of the address signal based on the slew rate set command generated by the slew rate set command generating part, the slew rate change part being inserted in series into an address line transmitting the address signal.

3. The memory controller as claimed in claim 2, wherein the slew rate change part includes
   a bias circuit part configured to output a current in response to the slew rate set command,
   a Complementary Metal Oxide Semiconductor (CMOS) inverter circuit part configured to output the address signal having the changed slew rate in response to the output current of the bias circuit part, the CMOS inverter circuit part being driven with the address signal and being supplied with the output current of the bias circuit part.

4. The memory controller as claimed in claim 1,
   wherein the first transmission line includes a branched section constituted of a first path and a second path connected in parallel with each other,
   wherein the first delay control part includes
   a first delay part inserted in series into the first path, and
   a first multiplexer configured to select either of data via the first path or data via the second path in response to the delay command,
   wherein the first delay control part controls the delay time by selecting one of the data via the first path and the data via the second path with the first multiplexer, and
   wherein the second transmission line includes a branched section constituted of a third path and a fourth path connected in parallel with each other,
   wherein the second delay control part includes
   a second delay part inserted in series into the third path, and
   a second multiplexer configured to select either of data via the third path or data via the fourth path in response to the delay command,
   wherein the second delay control part controls the delay time by selecting one of the data via the third path and the data via the fourth path with the second multiplexer.

5. The memory controller as claimed in claim 4, wherein the second delay control part selects the data via the third path when reading the second data from the UDIMM, and selects data via the fourth path when writing the first data to the UDIMM, and
   wherein the first delay control part selects the data via the first path when reading the second data from the RDIMM, and selects data via the second path when writing the first data to the RDIMM.

6. An information processing apparatus comprising:
   a processor;
   a memory device; and
   the memory controller as claimed in claim 1 configured to transmit data between the processor and the memory device.

7. The memory controller as claimed in claim 1, wherein the delay command generating part generates the delay command for setting the delay time to one cycle time of a system clock when writing the data in a case where the type of the DIMM determined by the determination part is the RDIMM.

8. The memory controller as claimed in claim 1, wherein the delay command generating part generates the delay command for setting the delay time to one cycle time of a system clock when reading the data in a case where the type of the DIMM determined by the determination part is the UDIMM.

* * * * *